(12) United States Patent
Helmick et al.

(10) Patent No.: US 12,499,040 B2
(45) Date of Patent: Dec. 16, 2025

(54) SOLVING SUBMISSION QUEUE ENTRY OVERFLOW WITH AN ADDITIONAL OUT-OF-ORDER SUBMISSION QUEUE ENTRY

(71) Applicant: Samsung Electronics Co., Ltd., Suwon-si (KR)

(72) Inventors: Daniel Lee Helmick, Thornton, CO (US); Chun-Chu Chen-Jhy Archie Wu, San Carlos, CA (US); Sumanth Jannyavula Venkata, Pleasanton, CA (US); Fnu Vikram Singh, Fremont, CA (US); Judith Rose Brock, Berkeley, CA (US); William Martin, Roseville, CA (US); Michael Allison, Longmont, CO (US); Robert Wayne Moss, Fort Collins, CO (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/227,902

(22) Filed: Jul. 28, 2023

(65) Prior Publication Data
US 2024/0168877 A1 May 23, 2024

Related U.S. Application Data

(60) Provisional application No. 63/453,754, filed on Mar. 21, 2023, provisional application No. 63/427,420, (Continued)

(51) Int. Cl.
*G06F 3/06* (2006.01)
*G06F 12/02* (2006.01)

(52) U.S. Cl.
CPC ........ *G06F 12/0246* (2013.01); *G06F 3/0604* (2013.01); *G06F 3/0659* (2013.01); *G06F 3/0679* (2013.01)

(58) Field of Classification Search
CPC ......... G06F 12/0246; G06F 2212/1016; G06F 3/061; G06F 3/0631; G06F 3/0673; G06F 3/0679; G06F 3/0659; G06F 3/0604
See application file for complete search history.

(56) References Cited

U.S. PATENT DOCUMENTS

| 8,554,968 B1 | 10/2013 | Onufryk et al. |
| 8,677,068 B2 | 3/2014 | Canepa et al. |

(Continued)

FOREIGN PATENT DOCUMENTS

| CN | 109542335 A | 3/2019 |
| CN | 112214435 A | 1/2021 |

(Continued)

OTHER PUBLICATIONS

Bhimani, Janki et al., "Fine-Grained Control of Concurrency Within KV-SSDs," Proceedings of the 14th ACM International Conference on Systems and Storage, Jun. 2021, 12 pages.

(Continued)

*Primary Examiner* — Rocio Del Mar Perez-Velez
*Assistant Examiner* — Julian S Mendel
(74) *Attorney, Agent, or Firm* — Renaissance IP Law Group LLP

(57) ABSTRACT

A memory is disclosed. The memory may include a first data structure and a second data structure. The first data structure may include a first field to store a first data relating to a command, and a related command field, the related command field to store a value. The second data structure may include a second field to store a second data relating to the command. A queue stored in the memory, may include the (Continued)

first data structure. A storage device may be configured to identify the first data structure and the second data structure (405, 705) as related based at least in part on the value.

17 Claims, 19 Drawing Sheets

Related U.S. Application Data filed on Nov. 22, 2022, provisional application No. 63/427,422, filed on Nov. 22, 2022.

(56) References Cited

U.S. PATENT DOCUMENTS

| | | | |
|---|---|---|---|
| 9,110,786 | B2 | 8/2015 | Carlson et al. |
| 9,304,690 | B2 | 4/2016 | McCambridge et al. |
| 9,760,281 | B2 | 9/2017 | Ramalingam |
| 10,387,078 | B1 | 8/2019 | Benisty |
| 10,466,903 | B2 | 11/2019 | Benisty et al. |
| 10,732,897 | B2 | 8/2020 | Benisty |
| 10,742,737 | B2 | 8/2020 | Choi et al. |
| 10,880,204 | B1 | 12/2020 | Shalev et al. |
| 10,884,658 | B2 | 1/2021 | Benisty |
| 10,891,061 | B2 | 1/2021 | Iwai et al. |
| 11,036,628 | B2 | 6/2021 | Hashimoto |
| 11,169,938 | B2 | 11/2021 | Gissin et al. |
| 11,294,827 | B2 | 4/2022 | Bennett et al. |
| 11,301,163 | B2 | 4/2022 | Zhang et al. |
| 11,301,370 | B2 | 4/2022 | Pasquale et al. |
| 11,409,469 | B2 | 8/2022 | Jo et al. |
| 11,461,052 | B1 | 10/2022 | Benisty |
| 11,461,238 | B2 | 10/2022 | Jang |
| 11,467,769 | B2 | 10/2022 | Benisty |
| 11,570,257 | B1 | 1/2023 | Tanach et al. |
| 11,714,767 | B1 | 8/2023 | Goldstein et al. |
| 2007/0276789 | A1 | 11/2007 | Keithley et al. |
| 2011/0060875 | A1* | 3/2011 | Haukness ............ G06F 3/0611 |
| | | | 711/E12.001 |
| 2012/0102275 | A1 | 4/2012 | Resnick |
| 2015/0223691 | A1 | 8/2015 | Choi et al. |
| 2015/0248366 | A1 | 9/2015 | Bergsten et al. |
| 2016/0027481 | A1* | 1/2016 | Hong .................... G11C 16/32 |
| | | | 365/189.011 |
| 2017/0060422 | A1* | 3/2017 | Sharifie ............... G06F 3/0659 |
| 2017/0097908 | A1 | 4/2017 | Simionescu et al. |
| 2017/0116117 | A1 | 4/2017 | Rozen et al. |
| 2017/0123721 | A1 | 5/2017 | Sela et al. |
| 2017/0123991 | A1 | 5/2017 | Sela et al. |
| 2017/0322897 | A1 | 11/2017 | Benisty et al. |
| 2018/0113615 | A1 | 4/2018 | Park |
| 2018/0335963 | A1 | 11/2018 | Simionescu et al. |
| 2019/0035445 | A1 | 1/2019 | Huang |
| 2019/0042146 | A1 | 2/2019 | Wysoczanski et al. |
| 2019/0243571 | A1 | 8/2019 | Narayanan et al. |
| 2019/0278523 | A1* | 9/2019 | Benisty ................ G06F 3/0658 |
| 2019/0294366 | A1 | 9/2019 | Kawamura et al. |
| 2020/0004445 | A1 | 1/2020 | Benisty |
| 2020/0151134 | A1 | 5/2020 | Helmick et al. |
| 2020/0174819 | A1 | 6/2020 | Dong et al. |
| 2020/0409601 | A1 | 12/2020 | Helmick et al. |
| 2021/0026780 | A1 | 1/2021 | Ahmed et al. |
| 2021/0103445 | A1 | 4/2021 | Schauer et al. |
| 2021/0182219 | A1 | 6/2021 | Benisty |
| 2021/0208810 | A1 | 7/2021 | Manohar |
| 2021/0247935 | A1 | 8/2021 | Beygi et al. |
| 2022/0027292 | A1 | 1/2022 | Gissin et al. |
| 2022/0035530 | A1 | 2/2022 | Vikram Singh |
| 2022/0035564 | A1 | 2/2022 | Vikram Singh et al. |
| 2022/0043570 | A1 | 2/2022 | Richter et al. |
| 2022/0083269 | A1 | 3/2022 | Sano et al. |
| 2022/0147276 | A1 | 5/2022 | Watanabe |
| 2022/0156001 | A1 | 5/2022 | Anandan et al. |
| 2022/0171572 | A1 | 6/2022 | Gyllenskog |
| 2022/0197704 | A1 | 6/2022 | Gibb et al. |
| 2022/0261183 | A1 | 8/2022 | Horspool et al. |
| 2022/0311716 | A1 | 9/2022 | Dutta |
| 2022/0357887 | A1* | 11/2022 | Wu ..................... G06F 13/1642 |
| 2023/0004329 | A1 | 1/2023 | Benisty |
| 2023/0079432 | A1 | 3/2023 | Kawaguchi |
| 2023/0297246 | A1 | 9/2023 | Nagai et al. |
| 2023/0333775 | A1* | 10/2023 | Jain ..................... G06F 3/0679 |
| 2023/0376422 | A1 | 11/2023 | Watanabe |
| 2024/0354021 | A1 | 10/2024 | Xu et al. |

FOREIGN PATENT DOCUMENTS

| | | |
|---|---|---|
| DE | 102020108303 A1 | 12/2020 |
| EP | 3945407 A1 | 2/2022 |
| WO | 2022143774 A1 | 7/2022 |

OTHER PUBLICATIONS

Borello, Gabriele, "Towards Computational Storage," Master's Degree Thesis, Politecnico Di Torino, Oct. 2021, 101 pages.

Marks, Kevin, "An NVM Express Tutorial," Flash Memory Summit, 2013, 92 pages.

Office Action for U.S. Appl. No. 18/227,897, mailed Sep. 16, 2024.

Final Office Action for U.S. Appl. No. 18/227,897, mailed Feb. 20, 2025.

NVM Express, "NVM Express Base Specification Revision 1.4," Jun. 2019, 64 pages.

Office Action for U.S. Appl. No. 18/227,899, mailed Mar. 3, 2025.

Notice of Allowance for U.S. Appl. No. 18/227,899, mailed Oct. 8, 2025.

Office Action for U.S. Appl. No. 18/227,897, mailed Oct. 28, 2025.

* cited by examiner

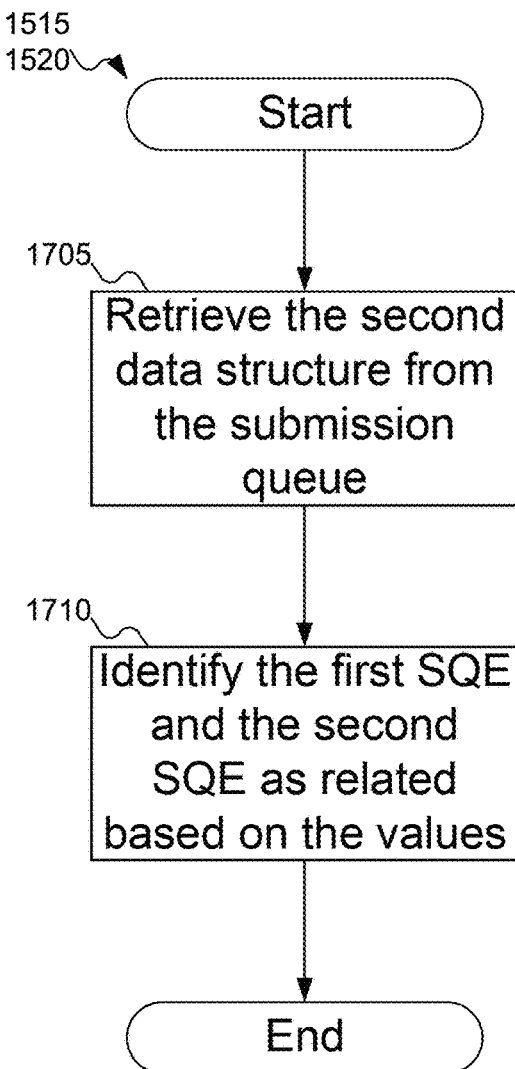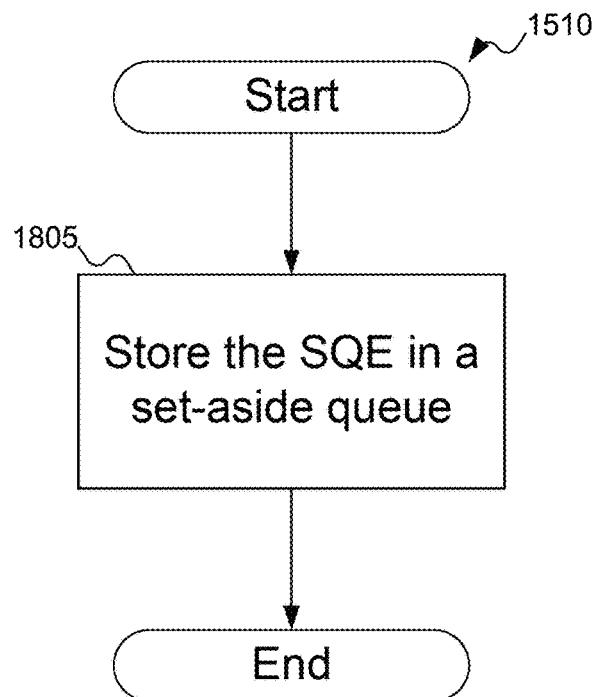
FIG. 17
FIG. 18

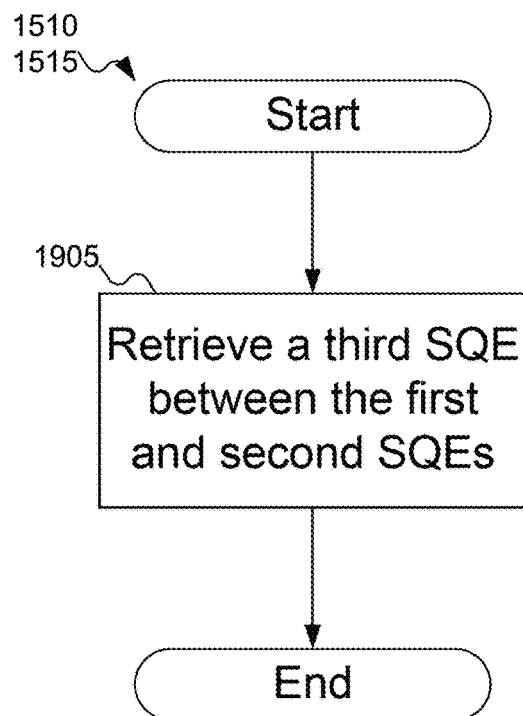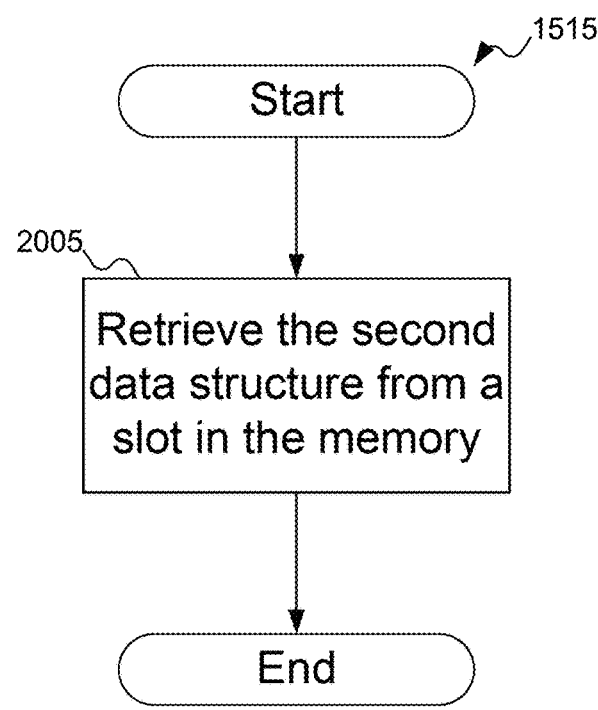
FIG. 19
FIG. 20

SOLVING SUBMISSION QUEUE ENTRY OVERFLOW WITH AN ADDITIONAL OUT-OF-ORDER SUBMISSION QUEUE ENTRY

RELATED APPLICATION DATA

This application claims the benefit of U.S. Provisional Patent Application Ser. No. 63/453,754, filed Mar. 21, 2023, U.S. Provisional Patent Application Ser. No. 63/427,422, filed Nov. 22, 2022, and U.S. Provisional Patent Application Ser. No. 63/427,420, filed Nov. 22, 2022, all of which are incorporated by reference herein for all purposes.

This application is related to U.S. patent application Ser. No. 18/227,897, filed Jul. 28, 2023, which claims the benefit of U.S. Provisional Patent Application Ser. No. 63/427,407, filed Nov. 22, 2022, both of which are incorporated by reference for all purposes.

This application is related to U.S. patent application Ser. No. 18/227,899, filed Jul. 28, 2023, which claims the benefit of U.S. Patent Application Ser. No. 63/427,415, filed Nov. 22, 2022, and U.S. Provisional Patent Application Ser. No. 63/427,410, filed Nov. 22, 2022, all of which are incorporated by reference herein for all purposes.

FIELD

The disclosure relates generally to storage devices, and more particularly to increasing the amount of data that may be included with a submission queue entry.

BACKGROUND

Hosts submit commands to storage devices using submission queues. A typical submission queue entry includes 64 bytes of data. Fields in the submission queue entries include, for example, an identifier for the command and the logical block address of the data, among other possibilities. But as the amount of data included in a submission queue entry, particularly information that is included in a standard, has grown, the space available for additional information that might be provided by the host has shrunk. Soon, almost every bit in a submission queue entry may be used, leaving no room for additional data that a host might want to include in a submission queue entry.

A need remains to support including additional data in a submission queue entry.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 17 shows a flowchart of an example procedure for the storage device of FIG. 1 to retrieve a second submission queue entry of FIG. 4 from the submission queue of FIG. 4 and to identify the second submission queue entry of FIG. 4 as being related to the submission queue entry of FIG. 4, according to embodiments of the disclosure.

FIG. 18 shows a flowchart of an example procedure for the storage device of FIG. 1 to store the submission queue entry of FIG. 4 in the set-aside queue of FIG. 8, according to embodiments of the disclosure.

FIG. 19 shows a flowchart of an example procedure for the storage device to retrieve a third submission queue entry of FIG. 4 between the two related submission queue entries of FIG. 4, according to embodiments of the disclosure.

FIG. 20 shows a flowchart of an example procedure for the storage device of FIGS. 1 to retrieve data relating to a command from the slots of FIG. 7, according to embodiments of the disclosure.

SUMMARY

Figure 1:
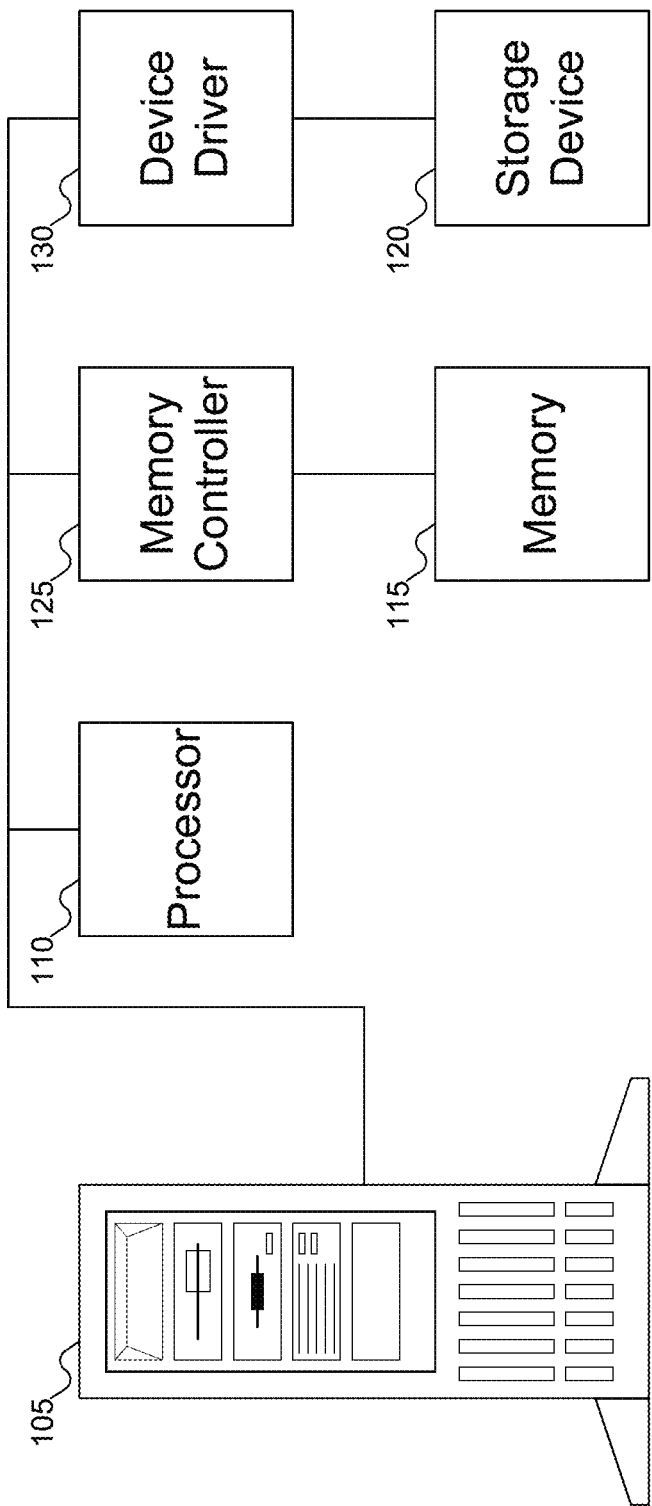
FIG. 1 shows a machine including a processor and storage device to support submission queue entries for commands sent to the storage device, according to embodiments of the disclosure.

Embodiments of the disclosure include a processor. The processor may add a submission queue entry to a submission queue. The processor may also establish a second data structure including additional data relating to the command. The second data structure may be another submission queue entry added to the submission queue or may be stored in a slot.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Submission queues provide a mechanism by which a host may send a command to a storage device. A submission queue is typically implemented as a circular buffer, often stored in the host memory, with entries of a fixed size, typically 64 bytes. When the host wants to issue a new command to the storage device, the host may place one or more entries in a submission queue. The host may then "ring the doorbell" by writing a new value in a submission queue tail pointer in the storage controller. The new value may point to the most recent entry added to the submission queue. The storage controller may be alerted to the new submission queue entry by the update to the submission queue tail pointer, and may then read the submission queue entry from the submission queue. The storage controller may also update a submission queue head pointer, to reflect that a submission queue entry has been removed from the submission queue. The submission queue head and tail pointers may be thought of as pointers to the oldest and newest entries in the submission queue, so that the submission queue may operate as a first in, first out (FIFO) queue (although the storage device may take entries from the submission queue in any desired order).

Initially, the submission queue entry included relatively few fields of data, leaving much of the submission queue entry reserved for future purposes. Because fields were not used, manufacturers could use those reserved fields for their own purposes. As standards have evolved, more of the data in the submission queue entry has been assigned specific purposes, which may make those fields unavailable for other purposes.

Some embodiments of the disclosure address this problem by repurposing two bits (labeled "FUSED" in the submission queue entry, and typically identified as bits 8-9 of double word 0). These bits are currently used in the standard, but have a particular meaning, identifying two separate commands that are intended to be executed back-to-back. Embodiments of the disclosure repurpose these bits to identify a second submission queue entry that may be thought of as an extension of the original submission queue entry, but without being a separate command.

Other embodiments of the disclosure address this problem repurposing the FUSED bits, but without requiring the commands to be back-to-back in the submission queue. Not only may the two related commands not be back-to-back (that is, there may be other intervening commands between the two related commands), but the related commands may even be presented out-of-order (that is, the "second" related command might be placed in the submission queue before the "first" related command). The FUSED bits, possibly in conjunction with other data in the submission queue entries, may be used to identify the related commands so that the storage device may process the commands correctly.

FIG. 1 shows a machine including a processor and storage device to support submission queue entries for commands sent to the storage device, according to embodiments of the disclosure. In FIG. 1, machine 105, which may also be termed a host or a system, may include processor 110, memory 115, and storage device 120. Processor 110 may be any variety of processor. Processor 110 may also be called a host processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), flash memory, etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115.

Storage device 120 may be used to store data that may be termed "long-term": that is, data that is expected to be stored for longer periods of time, or that does not need to be stored in memory 115. Storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol.

While FIG. 1 uses the generic term "storage device", embodiments of the disclosure may include any storage device formats that may benefit from the use of computational storage units, examples of which may include hard disk drives (HDDs) and Solid State Drives (SSDs). Any reference to "SSD" below should be understood to include other embodiments of the disclosure, such as HDDs or other storage device forms.

Embodiments of the disclosure may include any desired mechanism to communicate with storage device 120. For example, storage device 120 may connect to one or more busses, such as a Peripheral Component Interconnect Express (PCIe) bus, or storage device 120 may include Ethernet interfaces or some other network interface. Other potential interfaces and/or protocols to storage device 120 may include NVMe, NVMe over Fabrics (NVMe-oF), Remote Direct Memory Access (RDMA), Transmission Control Protocol/Internet Protocol (TCP/IP), Universal Flash Storage (UFS), embedded MultiMediaCard (eMMC), InfiniBand, Serial Attached Small Computer System Interface (SCSI) (SAS), Internet SCSI (iSCSI), Serial AT Attachment (SATA), and Compute Express Link® (CXL®), among other possibilities. (Compute Express Link and CXL are registered trademarks of the Compute Express Link Consortium, Inc. in the United States.)

Figure 2:
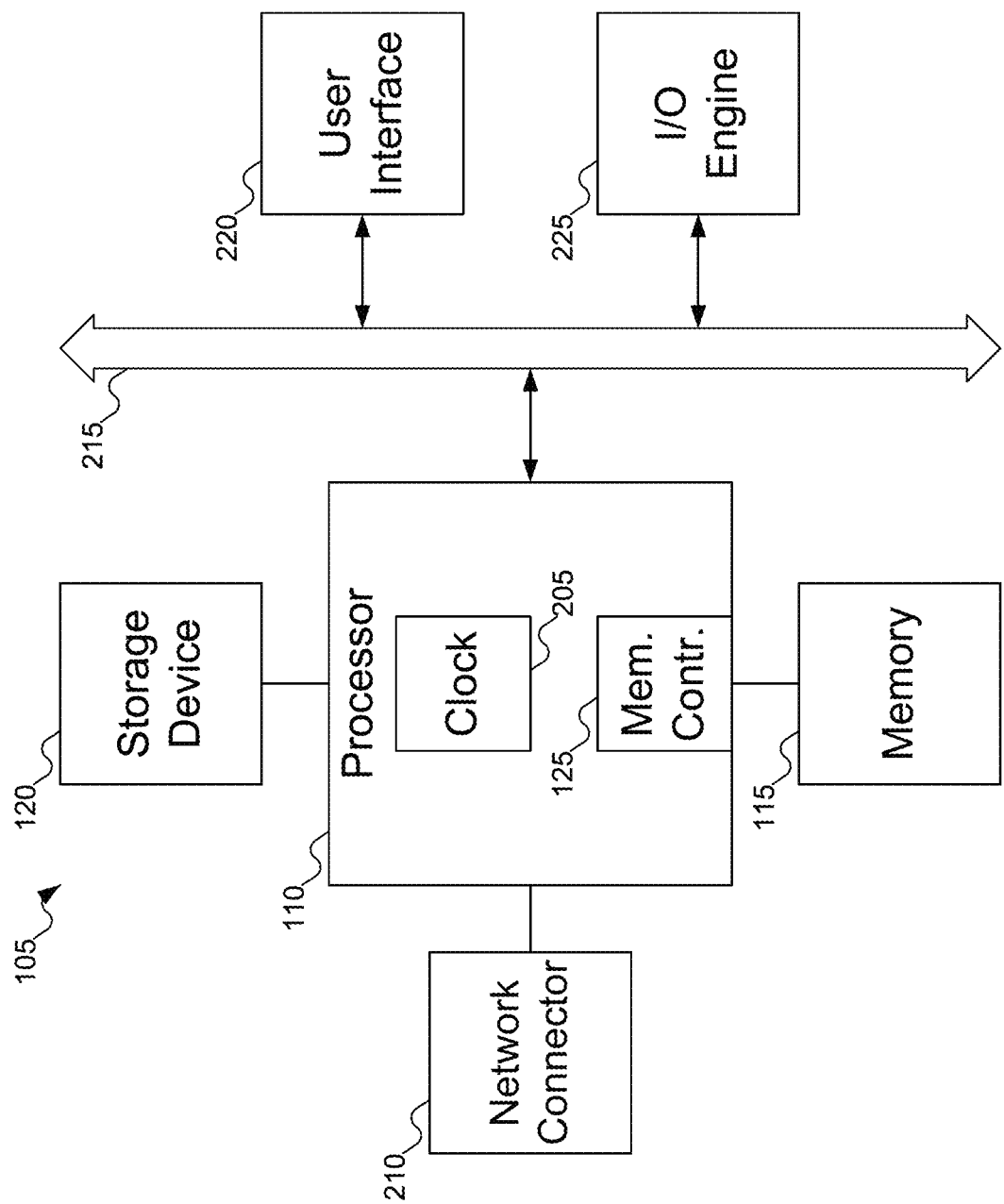
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
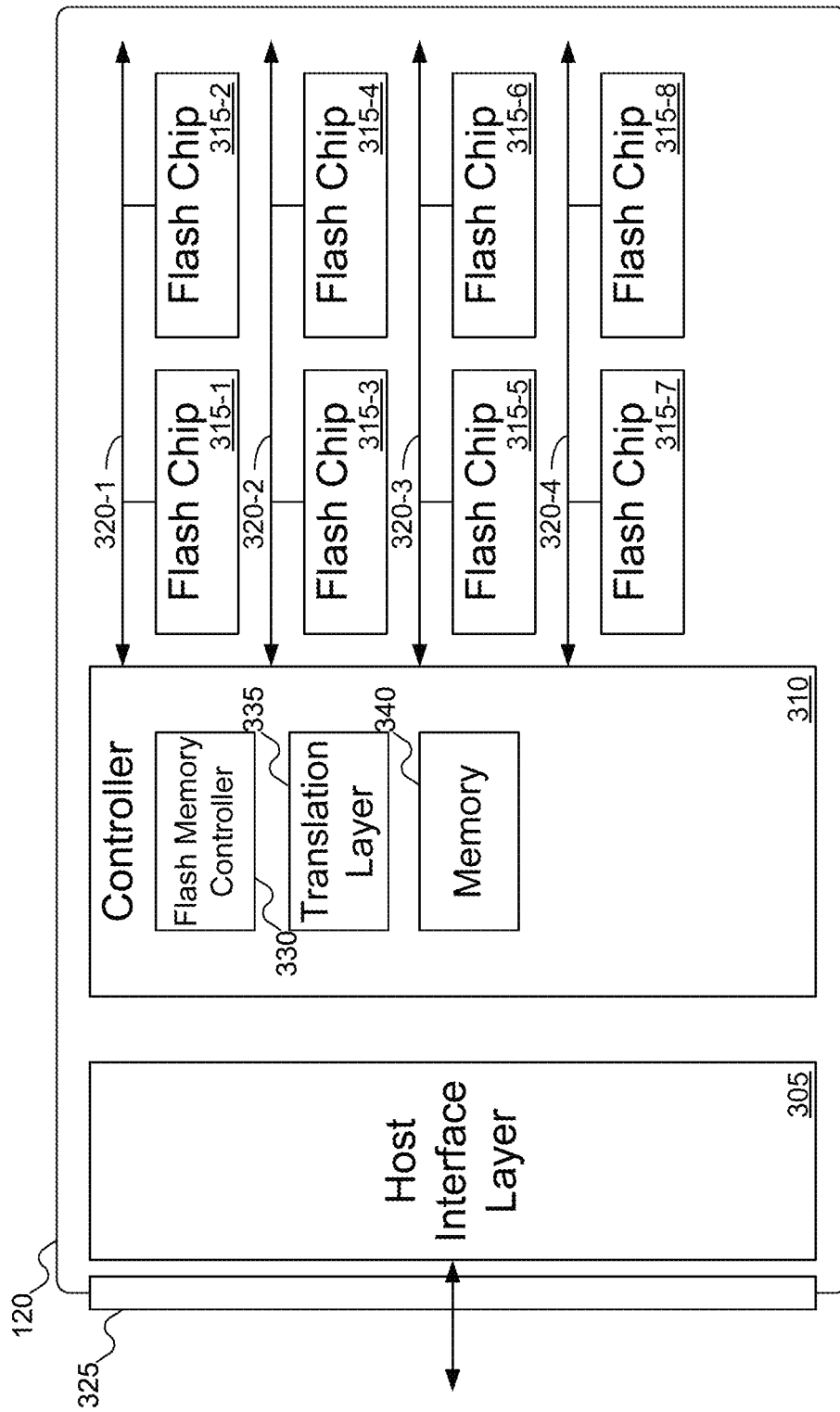
FIG. 3 shows details of the storage device of FIG. 1, according to embodiments of the disclosure.

FIG. 3 shows details of storage device 120 of FIG. 1, according to embodiments of the disclosure. In FIG. 3, the implementation of storage device 120 is shown as for a Solid State Drive. In FIG. 3, storage device 120 may include host interface layer (HIL) 305, controller 310, and various flash memory chips 315-1 through 315-8 (also termed "flash memory storage"), which may be organized into various channels 320-1 through 320-4. Host interface layer 305 may manage communications between storage device 120 and other components (such as processor 110 of FIG. 1). Such communication may be through, for example, a connector, such as connector 325. Host interface layer 305 may also manage communications with other devices aside from processor 110 of FIG. 1: for example, other storage devices (either local to or remote from machine 105 of FIG. 1) or remote processors. Communications with remote device may be handled, for example, over one or more network connections. These communications may include read requests to read data from storage device 120, write requests to write data to storage device 120, and delete requests to delete data from storage device 120.

Host interface layer 305 may manage an interface across only a single port, or it may manage interfaces across multiple ports. Alternatively, storage device 120 may include multiple ports, each of which may have a separate host interface layer 305 to manage interfaces across that port. Embodiments of the inventive concept may also mix the possibilities (for example, an SSD with three ports might have one host interface layer to manage one port and a second host interface layer to manage the other two ports).

Controller 310 may manage the read and write operations, along with garbage collection and other operations, on flash memory chips 315-1 through 315-8 using flash memory controller 330. SSD controller 310 may also include flash translation layer 335, which may manage the mapping of logical block addresses (LBAs) (as used by processor 110 of FIG. 1) to physical block addresses (PBAs) where the data is actually stored on storage device 120. By using flash translation layer 335, processor 110 of FIG. 1 does not need to be informed when data is moved from one block to another within storage device 120. Controller 310 may also include memory 340, which controller 310 may use for local processing. For example, controller 310 may use memory 340 as a buffer for data being received from or sent to processor 110 of FIG. 1.

While FIG. 3 shows storage device 120 as including eight flash memory chips 315-1 through 315-8 organized into four channels 320-1 through 320-4, embodiments of the inventive concept may support any number of flash memory chips organized into any number of channels. Similarly, while FIG. 3 shows the structure of a SSD, other storage devices (for example, hard disk drives) may be implemented using a different structure from that shown in FIG. 3 to manage reading and writing data, but with similar potential benefits.

Figure 4:
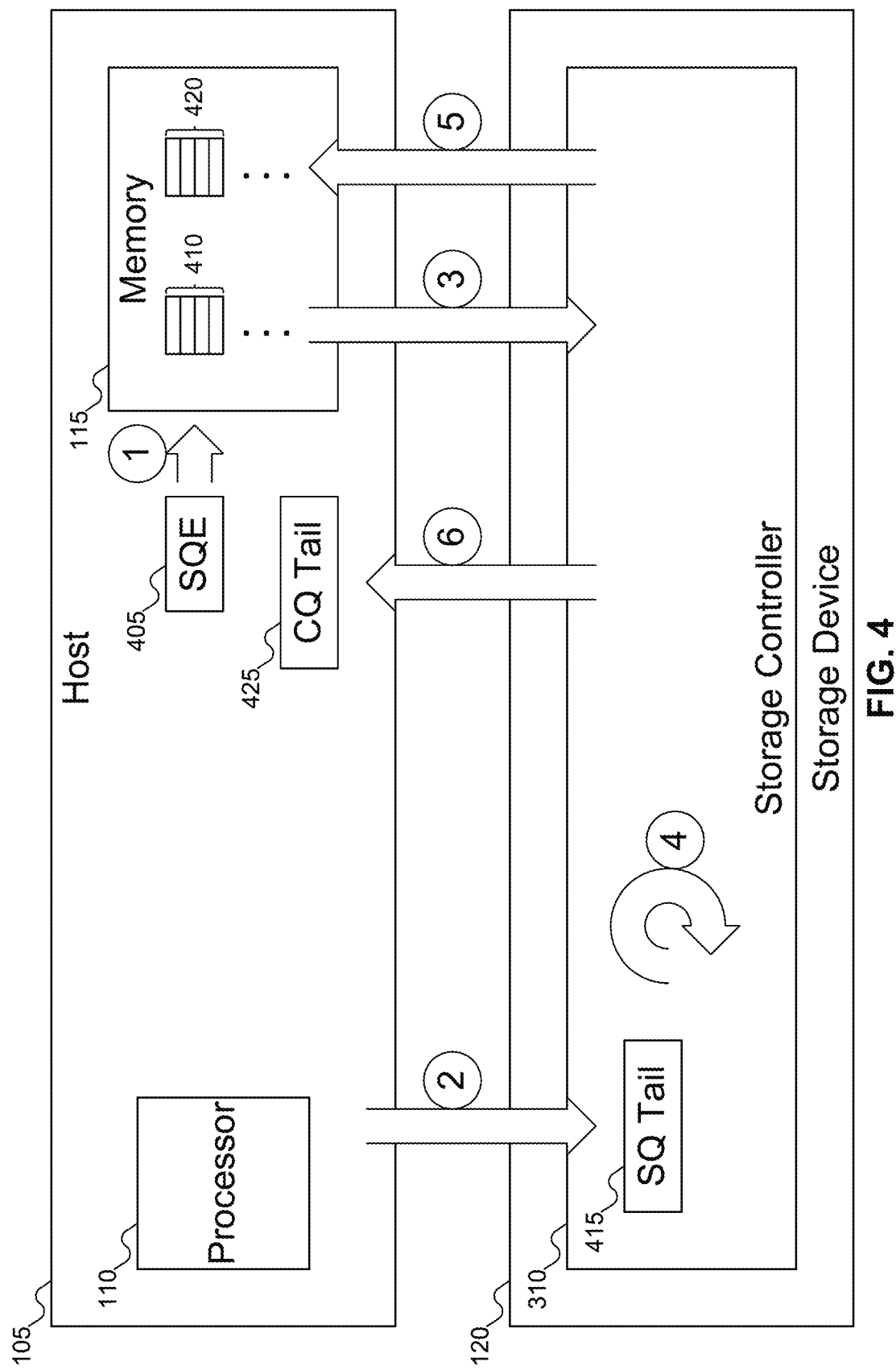
FIG. 4 shows the process of submitting a command to the storage device of FIG. 1 using a submission queue entry, according to embodiments of the disclosure.

FIG. 4 shows the process of submitting a command to storage device 120 of FIG. 1 using a submission queue entry, according to embodiments of the disclosure. In FIG. 4, host 105 (more specifically, processor 110 of FIG. 1) may establish submission queue entry (SQE) 405 (SQE 405 may also be referred to as data structure 405). SQE 405 may contain information about the particular request or command processor 110 is sending to storage device 120.

Figure 5:
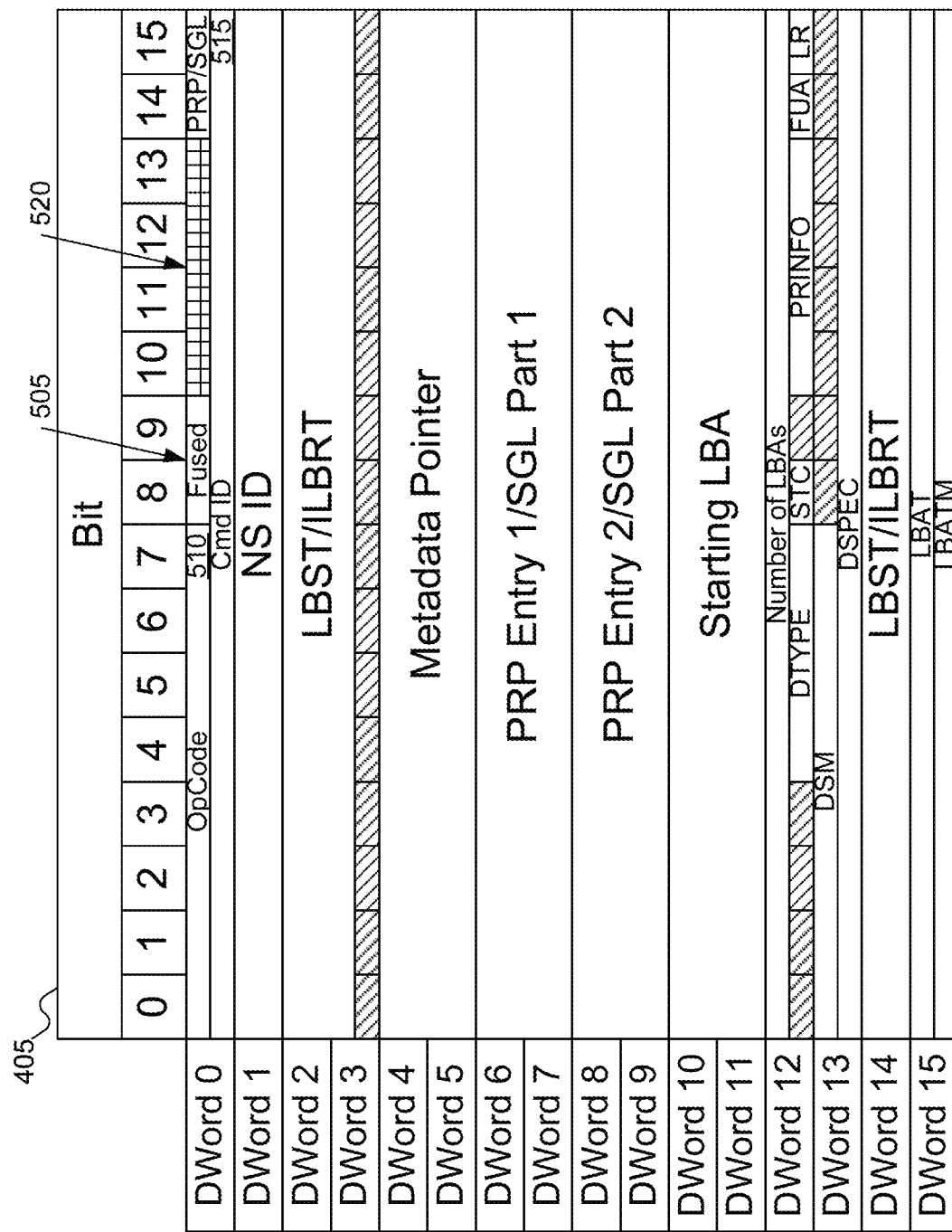
FIG. 5 shows details of the submission queue entry of FIG. 4 for a write command to be submitted to the storage device of FIG. 1, according to embodiments of the disclosure.

FIG. 5 shows details of SQE 405 of FIG. 4 for a write command to be submitted to storage device 120 of FIG. 1, according to embodiments of the disclosure. Different commands may structure SQEs differently, but embodiments of the disclosure are applicable to any SQE, regardless of how structured or what command is specified in the SQE.

SQE 405 includes various fields. For example, SQE 405 may include fields such as Fused 505, operation code (opcode) 510, and command identifier (ID) 515. SQE 405 may also include various other fields as shown. Table 1 below shows the meanings of the various acronyms used in FIG. 5.

TABLE 1

Table of Acronyms

| | |
|---|---|
| PRP | Physical Region Page |
| STC | Self-test Code |
| SGL | Scatter Gather List |
| FUA | Force Unit Access |
| LBST | Logical Block Storage Tag |
| DSM | Dataset Management |
| ILBRT | Initial Logical Block Reference Tag |
| DSPEC | Directive Specific |
| LBA | Logical Block Address |
| LBAT | Logical Block Application Tag |
| LBATM | Logical Block Application Tag Mask |
| LR | Limited Retry |
| opcode | Operation Code |
| CMD ID | Command Identifier |
| NS ID | Namespace Identifier |
| DTYPE | Directive Type |
| PRINFO | Protection Information Field |

Returning to FIG. 4, after SQE 405 has been established, processor 110 may add SQE 405 to submission queue 410. The addition of SQE 405 to submission queue 410 is shown in FIG. 4 as operation 1 (represented as a circle with the number 1 inside it). Processor 110 may then update submission queue tail pointer 415 in storage controller 310 of storage device 120, shown as operation 2. By updating submission queue tail pointer 415, processor 110 may inform storage device 120 that SQE 405 has been added to submission queue 410: submission queue tail pointer 415 may function as a doorbell being rung by processor 110. Note that other techniques may also be used to notify storage device 120 that SQE 405 has been added to submission queue 410. For example, submission queue tail pointer 415 might be stored in memory 115 of host 105, with another register in storage controller 310 being used as a doorbell: storage controller 310 might then read the value from submission queue tail pointer 415. Or, processor 110 might use an interrupt to inform storage device 120 to the new entry in submission queue 410.

Regardless of how processor 110 might notify storage device 120 that SQE 405 is in submission queue 410, once storage device 120 is aware, storage device 120 may read SQE 405 from submission queue 410, shown as operation 3. Storage device 120 may then execute the command specified by SQE 405, shown as operation 4.

Once storage device 120 has completed execution of the command, storage device 120 may add an entry to completion queue 420, shown as operation 5. Finally, storage device 120 may update completion queue tail pointer 425 to let processor 110 know that there is a new entry in completion queue 420. As with operation 2, operation 6 may be performed in other manners. For example, completion queue tail pointer 425 might be stored in storage device 120, and some register in processor 110 might act as a doorbell to alert processor 110 to the new entry in completion queue 420, or storage device 120 might use an interrupt to inform processor 110 to the new entry in completion queue 420. Head and tail doorbells may also be referred to as head and tail pointers.

Various other operations, not shown in FIG. 4, may also be part of the processing of SQE 405. For example, submission queue 410 and completion queue 420 may have head pointers, which may be used in removing entries from the queues: these head pointers are not shown in FIG. 4. Nor does FIG. 4 show what processor 110 might do after removing the entry from completion queue 420.

While FIG. 4 suggests that submission queue tail pointer 415 is stored in storage controller 310 and completion queue tail pointer 425 is stored in host 115, embodiments of the disclosure may place these elements (along with the corresponding queue head pointers) anywhere desired. For example, all four pointers might be in storage controller 310, or all four pointers might be in processor 110, or the four pointers may be distributed in any desired manner between processor 110 and storage controller 310.

While FIG. 4 shows one submission queue 410 and one completion queue 420, in some embodiments of the disclosure there may be more than one submission queue 410 and/or more than one completion queue 420 for use with storage device 120. For example, in some embodiments of the disclosure, the NVMe specification may support up to 65,536 submission queues 410 and 65,536 completion queues 420 (one submission queue and one completion queue may be used for administrative purposes, with the remaining queues used for input/output (I/O) purposes). The number of submission queues 410 and/or completion queues 420 may depend on the system configuration and/or performance requirements.

In addition, the size of submission queues 410 and/or completion queues 420 may vary. Administrative queues may include up to 4096 entries, whereas I/O queues may include up to 65,536 entries. Thus, at one extreme, there may be a total of 4,294,905,856 SQEs (65,536 SQEs in each of 65,535 I/O queues, plus 4096 SQEs in an administrative queue). Like the number of submission queues 410 and/or completion queues 420, the depth of the various queues may also be configured for the system.

Figure 6:
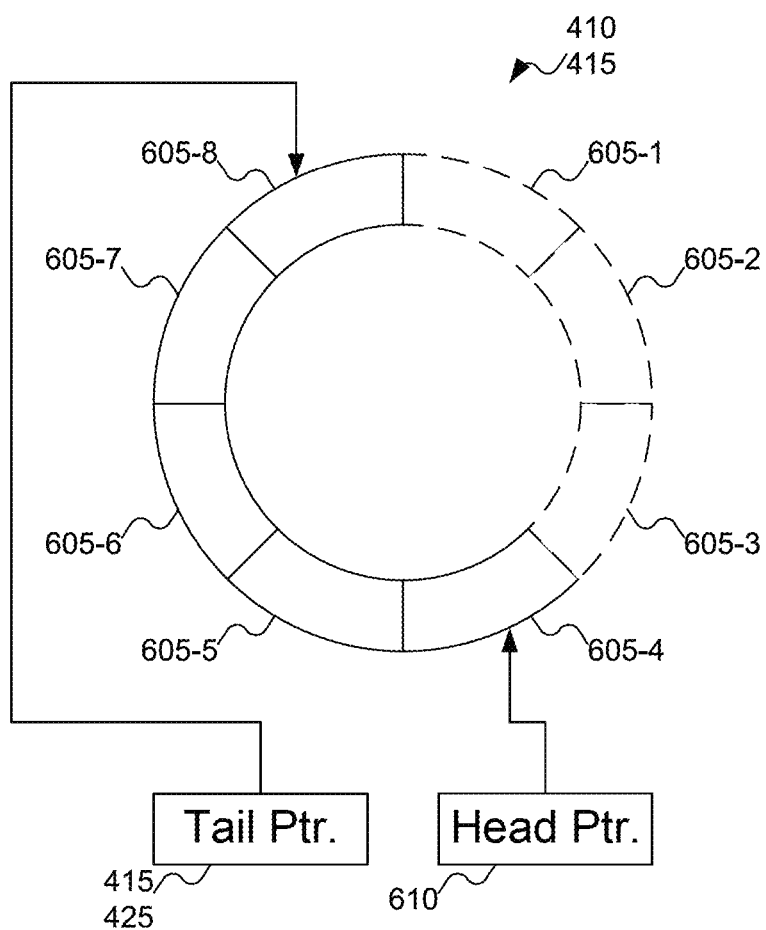
FIG. 6 shows a high-level representation of the submission queue of FIG. 4, according to embodiments of the disclosure.

FIG. 6 shows a high-level representation of submission queue 410 of FIG. 4, according to embodiments of the disclosure. In FIG. 6, submission queue 410 (and completion queue 420 as well) are shown as circular arrays. As implemented, submission queue 410 might not be "circular" per se, but may be stored in a block of memory that may have a lower address and an upper address: when an SQE has been added at the end of the block of memory, the next SQE may be added at the other end of the block of memory, thus achieving a "circular" implementation. Additionally, while submission queue 410 and/or completion queue 420 is shown in FIG. 6 as using a contiguous memory space, other embodiments of the disclosure may implement submission queue 410 (and/or completion queue 420) using noncontiguous blocks of memory, with the memory blocks being iterated in a sequential order before starting again at the beginning.

As shown in FIG. 6, submission queue 410 includes eight entries 605-1 through 605-8 (which may be referred to collectively as entries 605). Tail pointer 415 (for submission queue 410; for completion queue 420, tail pointer 425 may be used) may point to the most recently added entry, whereas head pointer 610 may point to the oldest entry (and therefore the entry to be removed first). Thus, as shown in FIG. 6, queue 410/420 currently includes (in order of entry into queues 410/420) entries 605-4, 605-5, 605-6, 605-7, and 605-8. Note that if the entry after tail pointer 415/425 is head pointer 610, then queue 410/420 is full, and if tail pointer 415/425 and head pointer 610 both point to the same entry, then queue 410/420 is empty.

Turning back to FIG. 5, as noted above, SQE 405 may have a specific structure. This structure may be defined according to a specification. As an example, the current specification for Non-Volatile Memory Express (NVMe Specification 2.0c), which is incorporated by reference herein for all purposes, defines the structure of SQE 405 as shown in FIG. 5. According to this specification, SQE 405 may include a total of 64 bytes of data. At this time, only 33 bits are not currently used in one field or another for an SQE sending a write command to storage device 120. These bits are shown with cross-hatching in FIG. 5. Put another way, SQE 405 is currently approximately 93.5% in use. Other technical proposals are currently being considered, which may further reduce the number of bits unallocated. For example, the Key Per Input/Output (KPIO) technical proposal, if adopted, may use 16 bits that are not currently allocated. A write command may be identified by the write opcode in SQE 405: other commands may have different opcodes. Other commands may have different structures, different sizes, and different numbers of bits that are not currently used.

While the size of SQE 405 could be increased beyond 64 bytes, changing the size of SQE 405 might involve changing how storage device 120 of FIG. 1 reads and processes SQEs, which might prevent backward compatibility with existing hardware. Thus, other techniques to support additional data delivery to storage device 120 of FIG. 1 are desired.

FIGS. 4 and 6 suggest that submission queue 410 (and completion queue 420 as well) may use a contiguous block of memory 115 of FIG. 1. But other embodiments of the disclosure may support queues 410 and/or 415 using noncontiguous blocks of memory. That is, a queue might use two or more different blocks of memory 115 of FIG. 1. In addition, each queue 410 and/or 415 may use different blocks of memory of different sizes, and may be independently located within memory 115 of FIG. 1. For example, one queue 410 or 415 might use a single contiguous block of memory 115 of FIG. 1, another queue 410 or 415 might use three noncontiguous blocks of memory, a third queue 410 or 415 might use 4 noncontiguous blocks of memory, and so on.

Embodiments of the disclosure may attempt to address the space available in SQE 405 by using a data structure in addition to SQE 405. This data structure may be another SQE 405 in submission queue 410, or it may be stored elsewhere in memory. If this data structure is stored elsewhere in memory, this data structure may be the same size as SQE 405, or it may be a different size. How this data structure may be used to provide additional space for data relating to the command in SQE 405 is discussed with reference to FIGS. 7-20 below.

Figure 7:
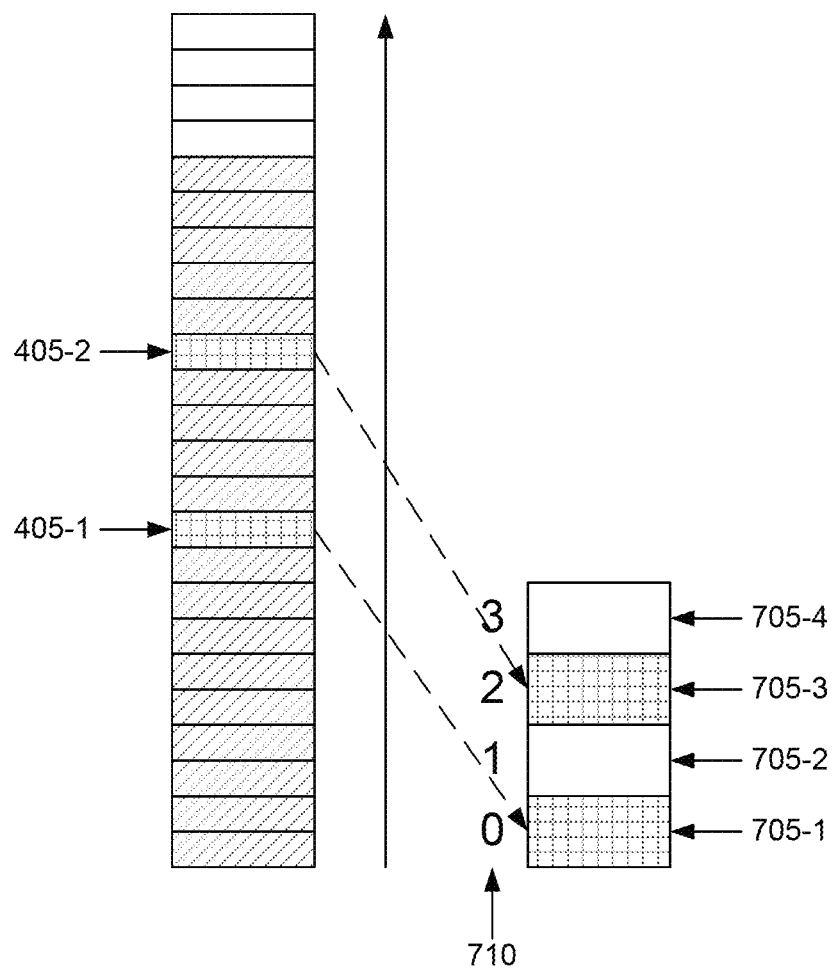
FIG. 7 shows the submission queue of FIG. 4 and slots to store additional data relating to a command in the submission queue entry of FIG. 4 in the submission queue of FIG. 4, according to embodiments of the disclosure.

FIG. 7 shows submission queue 410 of FIG. 4 and slots to store additional data relating to a command in SQE 405 of FIG. 4 in submission queue 410 of FIG. 4, according to embodiments of the disclosure. In FIG. 7, submission queue 410 may store SQEs 405. Most SQEs are shown with a diagonal crosshatching, indicating that those SQEs 405 store all the relevant data. But SQEs 405-1 and 405-2, shown with square crosshatching, may have additional data relating to the command that might not fit in SQEs 405-1 and 405-2. To handle this additional data relating to the command, processor 110 of FIG. 1 may establish a second data structure to store the additional data. This second data structure may be stored in a location in memory.

While this second data structure may be stored anywhere in memory 115 of FIG. 1, SQE 405 might then need enough room to store an address where the second data structure is stored in memory 115 of FIG. 1. As a memory address may be fairly lengthy (36 bits may be needed to represent a memory address in 32 gigabytes (GB) of memory, and even if the second data structure is aligned with a 4 kilobyte (KB) page boundary, 24 bits may be needed), given the limited unused space in SQE 405, there may be insufficient space to store a full memory address.

But if a portion of memory 115 of FIG. 1 is designated as the starting address for where such data structures may be stored, SQE 405 may only need to store the number of bits needed to represent the offset from the starting address. For a data structure that stores 64 bytes of data, the number of bits needed to represent the offset may be relatively few: perhaps 10 bits, depending on the number of such data structures that might be stored in memory 115 of FIG. 1. (The number of bits needed may vary with the size of the data structures and the number of such structures that may be stored in memory 115 of FIG. 1).

The number of bits needed may be reduced even further, if each data structure is the same size. (This is not to say that each data structure must hold exactly the same amount of data, but rather that each data structure may store up to some predetermined amount of data, which may be fixed for all data structures stored in memory 115 of FIG. 1.) In this situation, the number of bits needed is reduced down to the number of different data structures to be stored in memory 115 of FIG. 1. Thus, for example, if memory 115 of FIG. 1 may store four such data structures, only 2 bits are needed to uniquely identify a data structure: the offset for each data structure may be determined as some multiple of the size of each data structure. For descriptive purposes, memory 115 of FIG. 1 may be said to have some number of "slots", with each slot storing a data structure.

FIG. 7 shows a memory 115 of FIG. 1 as including may store four slots 705-1 through 705-4 (which may be referred to collectively as slots 705). Each slot 705 may be identified by slot numbers 710, with each slot 705 potentially storing a data structure. Slot 705-1 may store a data structure containing data relating to the command in SQE 405-1, and slot 705-3 may store a data structure containing data relating to the command in SQE 405-2.

To inform storage device 120 of FIG. 1 that slot 705 stores additional data, SQE 405 may use some currently unused bits to store slot number 710 for slot 705 storing the data structure containing the additional data related to the command. These bits may be, for example, field 520 of FIG. 5. In FIG. 5, four bits are shown as being used for field 520, but embodiments of the disclosure may use fewer bits. For example, as FIG. 7 shows four slots 705, which may be uniquely identified using only two bits, field 520 of FIG. 5 might be only two bits in length rather than four bits in length. With four bits as in field 520 of FIG. 5, up to 16 slots 705 may be supported. SQE 405 may also include use an additional field to indicate that embodiments of the disclosure are being used: for example, Fused 505 of FIG. 5 may be set to 11 (a value not otherwise used for Fused 505 of FIG. 5) to indicate that embodiments of the disclosure are being used).

Another approach that may be used to identify a corresponding slot 705 in SQE 405 is to assign a particular bit in SQE 405 to a particular slot 705. If that bit is set, then the corresponding slot 705 stores the data relating to the command. For example, bit 10 of double word 0 in SQE 405 might correspond to slot 705-1, bit 11 of double word 0 in SQE 405 might correspond to slot 705-2, and so on. This approach may be easier for storage device 120 of FIG. 1 to use to identify the corresponding slot 705, but may require more bits to represent all possible slots 705 in SQE 405.

It may be noted that while SQEs 405-1 and 405-2 are (presumably) not separated by another SQE 405 using one of slots 705, slot 705-3 stores the data relating to the command of SQE 405-2. This is because slots 705 may be used in any order: they do not have to be used sequentially. Of course, there is no reason slots 705 could not be used consecutively: if the order of data being added to slots 705 may be guaranteed to match the order of SQEs 405 in submission queue 410, only one bit in SQE 405 might be needed to indicate that there is data relating to the command in one of slots 705: the ordering of slots 705 should be sufficient to identify which slot 705 stores data for the next SQE 405 needing to store data in slots 705. But then slots 705 might need head and tail pointers like submission queue 410 (and completion queue 420 of FIG. 4), so that processor 110 of FIG. 1 may know where to insert data structures into slots 705 and storage device 120 of FIG. 1 may know where to remove data structures from slots 705.

But if data may be inserted into slots 705 in any order, then processor 110 of FIG. 1 may need some mechanism to know which slots are empty and which are full. If slots 705 are all full (which may be referred to as backpressure), then processor 110 of FIG. 1 may have to wait to write data into slots 705 until a slot 705 is available (and processor 110 may also have to wait to write the corresponding SQE 405 into submission queue 410 of FIG. 4). Any desired mechanism may be used to indicate which slots are empty and which are full. For example, memory 115 of FIG. 1 might store somewhere (either as part of slot 705 or elsewhere) one bit (or more) for each slot, which may be called a phase bit. When processor 110 of FIG. 1 writes data to a slot 705, the corresponding bit in memory 115 of FIG. 1 may be set, and when storage device 120 of FIG. 1 retrieves data from a slot 705, the corresponding bit in memory 115 of FIG. 1 may be cleared. For example, a phase bit value of 1 may indicate that slot 705 has yet to be read by storage device 120 of FIG. 1, and a phase bit value of 0 may indicate that slot 705 has been read by storage device 120 of FIG. 1. (The roles of these values may be interchanged, and if more than one bit is used to indicate a phase, other values may be used instead). Using such a mechanism, processor 110 of FIG. 1 simply needs to locate a slot 705 whose corresponding bit is cleared, and that slot 705 may then be used to store data relating to a command in SQE 405.

Another mechanism that may be used is for processor 110 of FIG. 1 to look for SQEs 405 currently pending in submission queue 410. Any SQE 405 in submission queue 410 that is using a slot 705 means that slot 705 is currently being used; any slots 705 not so used are free and may be used to store data for another SQE 405. Alternatively, processor 110 of FIG. 1 may examine the entirety of submission queue 410 (specifically, SQEs 405 that have already been "removed" from submission queue 410: while still present in memory 110 of FIG. 1, head pointer 610 of FIG. 6 may have advanced past those SQEs 405 to indicate that those SQEs are not currently pending). Any SQEs 405 that used a slot 705 but have been removed from submission queue 410 may mean that that slot 705 is free. (But if that slot 705 has been reused for another SQE 405, this approach might incorrectly identify slots as free that are actually in use.)

Figure 8:
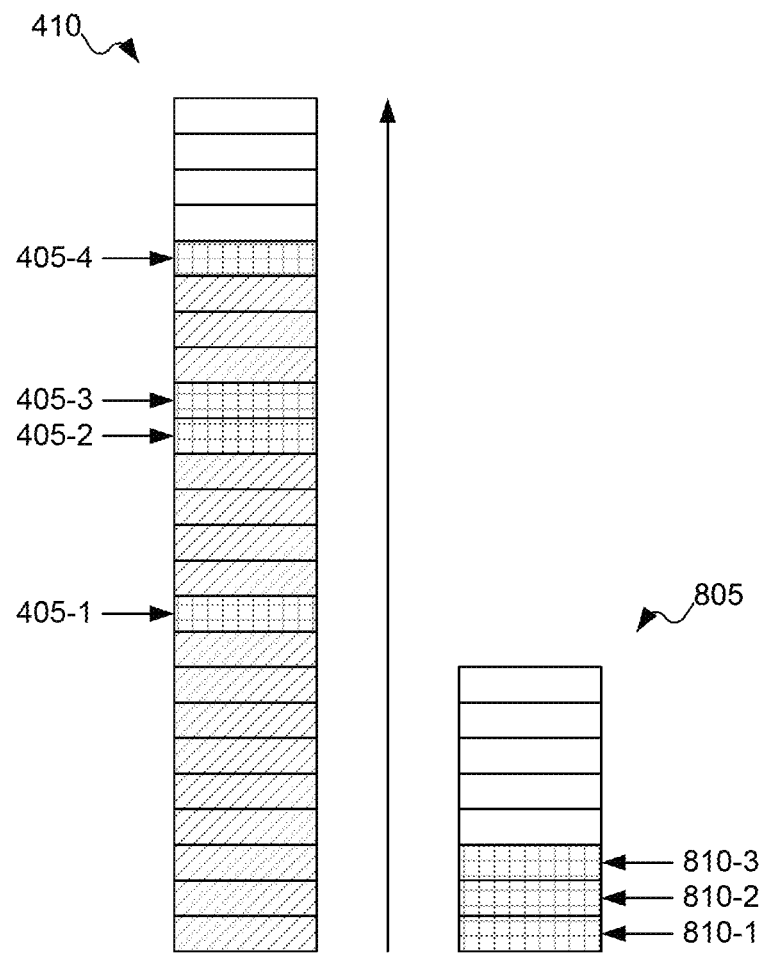
FIG. 8 shows the submission queue of FIG. 4 and a set-aside queue to store submission queue entries of FIG. 4 until a second related submission queue entry of FIG. 4 is received, according to embodiments of the disclosure.

FIG. 8 shows submission queue 410 of FIG. 4 and a set-aside queue to store SQEs 405 of FIG. 4 until a second related SQE 405 of FIG. 4 is received, according to embodiments of the disclosure. In FIG. 8, rather than using slots 705 of FIG. 7, two SQEs 405 may be used to convey information relating to the command. For example, SQEs 405-1 and 405-4 might be two SQEs each containing part of the information relating to a single command. When storage device 120 of FIG. 1 retrieves SQE 405-1 from submission queue 410, storage device 120 of FIG. 1 may store SQE 405-1 in set-aside queue 805 (which may be stored internal to storage device 120 of FIG. 1: for example, in memory 340 of FIG. 3). In FIG. 8, SQE 405-1 may be stored as entry 810-1 in set-aside queue 805. Then, when storage device 120 of FIG. 1 retrieves SQE 405-4 from submission queue 410 (containing the other data relating to the command), storage device 120 of FIG. 1 may pair SQE 405-4 with entry 810-1 and execute the command (using all the data relating to the command).

Storage device 120 of FIG. 1 may determine that SQEs 405-1 and 405-4 contain related data in a number of different ways. One approach is to use opcode 510 of FIG. 5 and/or command ID 515 of FIG. 5 to identify related commands. For example, in some embodiments of the disclosure, both SQEs 405-1 and 405-4 might use the same opcode 510 of FIG. 5 and the same command ID 515 of FIG. 5. Field 520 of FIG. 5 (or bits therein) may then be used to indicate that the commands are linked. This linking may be represented in different ways. For example, one bit (such as bit 10 of double word 0) of field 520 of FIG. 5 might indicate that SQE 405 is one of two related SQEs 405, and another bit (such as bit 11 of double word 0) of field 520 of FIG. 5 might indicate whether SQE 405 is the first or second linked SQE. Or, field 520 of FIG. 5 might be used to store a group ID, which may uniquely identify linked SQEs. Or, each bit in field 520 of FIG. 5 might represent a unique linking of SQEs: two SQEs may be linked by bit 10 of double word 0, two SQEs may be linked by bit 11 of double word 0, and so on. Or, SQE 405-4 might have different fields, despite using the same opcode 510 of FIG. 5, which may indicate that SQE 405-4 is not a separate command but is linked to some other SQE 405. Or, SQE 405-4 might include opcode 510 of FIG. 5 and/or command ID 515 of FIG. 5 from SQE 405-1, but stored as a data field in SQE 405-4 rather than in the normal field for those data. Or, two SQEs may be linked by bit 11 of double word 0 combined with a constraint on the command IDs being sequential. Bit 11 may convey there are linked commands, and the ordering of the command IDs may convey which is the first command and which is second command, so that the other SQE fields may be parsed appropriately. The structure of SQE 405, particularly when used to store additional data for a command in another SQE, is discussed with reference to FIG. 9 below.

For all of the above description using field 520 of FIG. 5, other bits may be used instead. Embodiments of the disclosure are not limited to using only field 520 of FIG. 5 in SQE 405. For example, Fused 505 of FIG. 5 may be set to 11 (an undefined value for Fused 505 of FIG. 5) may be used to indicate that SQE 405 is one of two linked SQEs 405.

Another approach is to have different opcodes. For example, in other embodiments the disclosure, a new opcode 510 of FIG. 5 may be defined. For example, a command to write data to storage device 120 might have a particular opcode 510 of FIG. 5: a variant of this opcode, that is a second (new) opcode, might be defined to identify SQE 405 has storing additional data relating to a command in another SQE. So, a "WRITE2" command may indicate that that SQE 405 contains additional data relating to another "WRITE" command in another SQE 405. Note that the second opcode does not have to include the name of the original opcode 510 of FIG. 5, but could instead be something like "CONT" to indicate that SQE 405 contains continuation data for some other SQE 405 (which itself could have any opcode 510 of FIG. 5). Thus, this new opcode 510 of FIG. 5 could be used for any command, such as "WRITE", "READ", etc. To assist in linking the two SQEs 405, the linked SQEs 405 may use the same (or sequential) command ID(s) 515 of FIG. 5, or additional data may be stored in SQEs 405, such as using field 520 of FIG. 5, as described above.

If both opcode 510 of FIG. 5 and command ID 515 of FIG. 515 of FIG. 5 are different in both SQEs 405, then other data may be stored in SQEs 405 to identify that the SQEs 405 are linked. For example, opcode 510 of FIG. 5 and/or command ID 515 of FIG. 5 of SQE 405-1 (the SQE containing the command) may be stored as data within SQE 405-4 (the SQE containing the additional data relating to the command). Again, additional data may be stored in SQEs 405, such as using field 520 of FIG. 5, to link SQEs 405.

In some embodiments of the disclosure, more than two SQEs 405 might be linked. For example, three (or more) SQEs 405 might be linked, all containing data relating to a second command. If the number of related SQEs 405 may vary, then storage device 120 of FIG. 1 may determine when the last related SQE 405 has been retrieved. For example, the last related SQE 405 might have a field storing a value indicating that that SQE 405 is the last. Or one or more of SQEs 405 may include in some field a count of the number of related SQEs 405, so that storage device 120 of FIG. 1 may determine when all related SQEs 405 have been retrieved from submission queue 410.

But just as backpressure might occur in embodiments of the disclosure using slots 705 of FIG. 7, backpressure might also occur when multiple related SQEs 405 are placed in submission queue 410. The concern is less that submission queue 410 might become full (with up to 65,536 SQEs 405 in submission queue 410, the likelihood of submission queue 410 becoming full is relatively low), but that storage device 120 of FIG. 1 might have a maximum number of supported SQE pairs in submission queue 410, and submission queue 410 might already have that maximum number of SQE pairs in submission queue 410. For example, as described above, field 520 of FIG. 5 might store a group ID. If field 520 of FIG. 5 includes a total of four bits (as shown in FIG. 5), then field 520 of FIG. 5 may support a maximum of $2^4=16$ group IDs, which becomes a limit on the number of SQE pairs in submission queue 410. Before adding a new SQE pair to submission queue 410, processor 110 of FIG. 1 may need to confirm that the selected group ID for the new SQE pair is not already used for an SQE pair currently in submission queue 410. (An SQE pair may be said to be in submission queue 410 if either, or both, SQEs 405 in the SQE pair has been stored in submission queue 410 but has yet to be read by storage device 120 of FIG. 1: that is, submission queue head pointer 610 of FIG. 6 has yet to advance past both SQEs 405 in the SQE pair.) If every group ID is currently being used by an SQE pair in submission queue 410, then backpressure may cause processor 110 of FIG. 1 to delay adding a new SQE pair to submission queue 410.

Note that in both FIGS. 7 and 8, the order in which the various data structures are stored is not relevant. That is, in FIG. 7, SQE 405 of FIG. 4 may be added to submission queue 410 of FIG. 4 either before or after the data structure is stored in slots 705 of FIG. 7. (While it is preferable for the data structure to be stored in slots 705 of FIG. 7 before SQE 405 of FIG. 4 is added to submission queue 410 of FIG. 4—to ensure that when storage device 120 of FIG. 1 retrieves SQE 405 of FIG. 4 from submission queue of FIG. 4—storage device 120 of FIG. 1 may hold SQE 405 of FIG. 4 until the data structure is stored in slots 705 of FIG. 7.) Similarly, the related SQEs 405 of FIG. 4 may be added to submission queue 410 of FIG. 4 in any order. Storage device 120 of FIG. 1 may wait until both SQEs 405 of FIG. 4 have been retrieved from submission queue 410 of FIG. 4 before executing the command, regardless of the order in which storage device 120 of FIG. 1 retrieves the SQEs 405 of FIG. 4 from submission queue 410 of FIG. 4.

Figure 9:
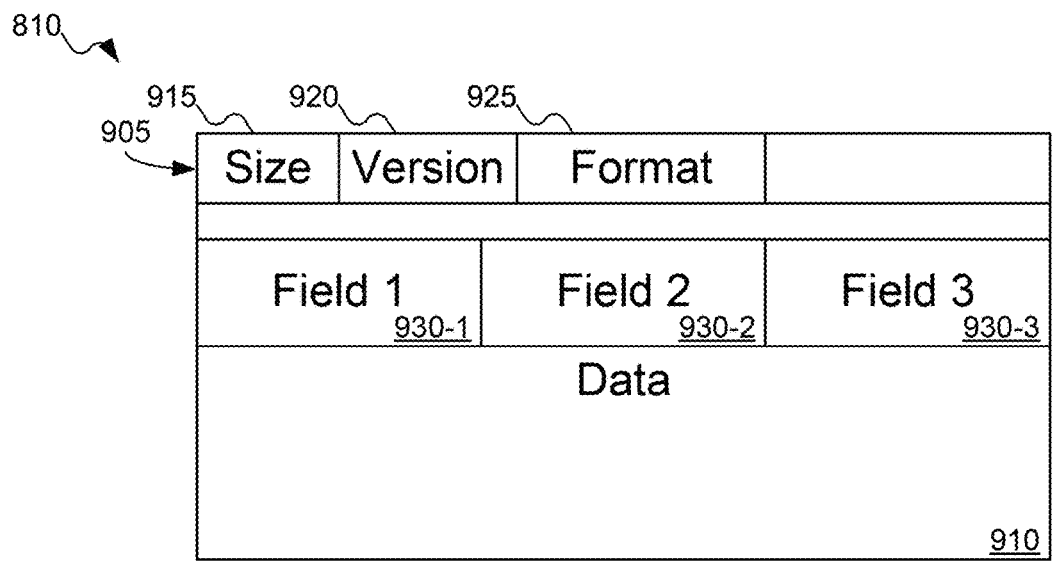
FIG. 9 shows details of the submission queue entry of FIG. 4 used to store additional command data for another submission queue entry of FIG. 4 in the submission queue of FIG. 4, according to embodiments of the disclosure.

FIG. 9 shows details of SQE 405 of FIG. 4 used to store additional command data for another SQE 405 of FIG. 4 in submission queue 410 of FIG. 4, according to embodiments of the disclosure. In FIG. 9, entry 810, which may store SQE 405 of FIG. 4 containing additional data relating to a command in another SQE 405 of FIG. 4, may include two portions 905 and 910. Portion 905 may function as a header, storing various pieces of information that may govern how portion 910 may be interpreted. For example, portion 905 may include size 915, version 920, and/or format 925. Size 915 may be the size of the data stored in portion 910. Version 920 might specify a particular version of the data structure used in portion 910, which might indicate what fields are supported in portion 910 or other information, such as the size of portion 910. Finally, format 925 might specify a particular format used for the data in portion 910: for example, that the data is stored in eXtensible Markup Language (XML) format or JavaScript Object Notation (JSON) format.

In addition, portion 910 may include various fields, such as fields 930-1, 930-2, and 930-3 (which may be referred to collectively as fields 930). Fields 930 may store specific data expected for the command in SQE 405 of FIG. 4. For example, fields 930 might include command ID 515 of FIG. 5, enabling storage device 120 of FIG. 1 to pair entry 810 with the correct SQE 405 of FIG. 4. Note that fields 930 might include more than just one value per field: for example, one field 930 might include both command ID 515 of FIG. 5 and opcode 510 of FIG. 5, to further ensure a correct pairing. Note also that not all fields are necessarily required. For example, processor 110 of FIG. 1 might provide data for fields 930-1 and 930-3, but not for field 930-2. Which fields 930 include data may depend on the command in SQE 405 of FIG. 4, and what additional data processor 110 of FIG. 1 wants to provide for that command.

Figure 10:
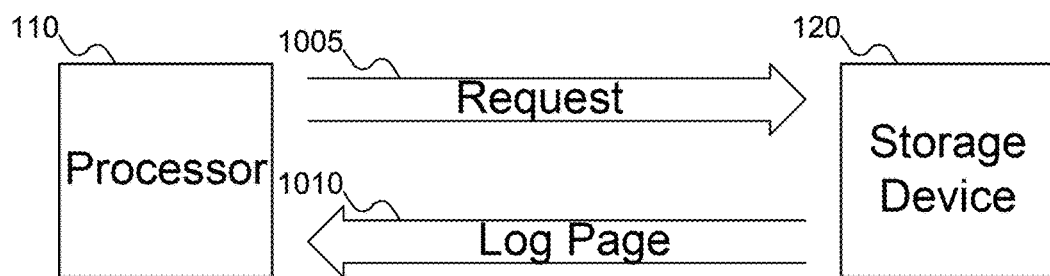
FIG. 10 shows the processor of FIG. 1 requesting and receiving a log page from the storage device of FIG. 1, for information about the structure of the submission queue entry of FIG. 4, according to embodiments of the disclosure.

In some embodiments of the disclosure, storage device 120 of FIG. 1 may have expectations regarding what data is to be provided in entry 810. For example, storage device 120 of FIG. 1 might expect the data in a particular format, or might be configured to support only certain fields in portion 910 of FIG. 9. FIG. 10 shows how processor 110 of FIG. 1 may request this information from storage device 120 of FIG. 1.

FIG. 10 shows processor 110 of FIG. 1 requesting and receiving a log page from storage device 120 of FIG. 1, for information about the structure of SQE 405 of FIG. 4, according to embodiments of the disclosure. Processor 110 may send request 1005 to storage device 120, which may respond in turn with log page 1010. Log page 1010 may be a log page that includes information about the expected structure of SQE 405 of FIG. 4. For example, log page 1010 may include information about size 915 of FIG. 9, version 920 of FIG. 9, format 925 of FIG. 9, or which fields 930 of FIG. 9 are supported by storage device 120. In this manner, processor 110 may establish SQE 405 of FIG. 4 in a manner consistent with the expectations (and capabilities) of storage device 120.

While FIG. 10 shows storage device 120 sending a log page in response to request 1005, embodiments of the disclosure may also use other data structures or mechanisms to transfer information about the expected structure of SQE 405 of FIG. 4. For example, the information may be conveyed in a message, in a vendor-specific data structure, via an NVMe Management Interface (NVMe-MI), or stored in a readable location in host 105 by storage device 120, such as a buffer, register, or a Vital Product Data in some form of Read-Only Memory (ROM), such as a Programmable Read-Only Memory (PROM), an Erasable Programmable Read-Only Memory (EPROM), or an Electrically Erasable Programmable Read-Only Memory (EEPROM).

In addition, while the above description focuses on FIGS. 9-10 providing information about the structure of SQE 405 of FIG. 4 (and in particular SQE 405 of FIG. 4 that includes additional data relating to a command in another SQE 405 of FIG. 24, FIGS. 9-10 may also be used to describe the structure of slots 705 of FIG. 7 and how processor 110 of FIG. 1 and storage device 120 of FIG. 1 may negotiate the structure used in slots 705 of FIG. 7.

Storage device 120 of FIG. 1 may describe its capabilities related to embodiments of the disclosure using log page 1010. For example, storage device 120 of FIG. 1 might specify the maximum number of outstanding concurrent SQE pairs that may be in submission queue 410 of FIG. 4 at a given time. This limit might mean that the processor 110 of FIG. 1 monitors submission queue head pointer 610 of FIG. 6 and submission queue tail pointer 415 of FIG. 4 to ensure that the number of SQE pairs in submission queue 410 of FIG. 4 does not exceed this limit. Alternatively storage device 120 of FIG. 1 may communicate other limitations, such as the maximum separation of the two SQEs 405 of FIG. 4 in an SQE pair, which version of the SQE pair is supported, if an extended pair capability is available on both the administration I/O queue and standard I/O queues (which may be referred to as the NVM queue), and so on.

Storage device 120 of FIG. 1 may also place other limitations on the use of SQE pairs. For example, storage device 120 of FIG. 1 may specify that both SQEs 405 of FIG. 4 for a given SQE pair are added to submission queue 410 of FIG. 4 before tail pointer 415 is updated. This limitation may avoid storage device 120 of FIG. 1 having to deal with the situation where only one SQE 405 of FIG. 4 for a given pair is found in submission queue 410 of FIG. 4: if that situation arises, storage device 120 of FIG. 1 may then return an error. (Storage device 120 of FIG. 1 may also return another error if the second SQE 405 of FIG. 4 is later encountered.) Or, storage device 120 of FIG. 1 might require that both SQEs 405 of FIG. 4 in a given SQE pair are added to submission queue 410 of FIG. 4 within a given interval (for example, one second). If both SQEs 405 of FIG. 4 of a given SQE pair are not added to submission queue 410 of FIG. 4 in a timely manner, storage device 120 of FIG. 1 may return an error when either (or both) SQEs 405 of FIG. 4 of the SQE pair are encountered. Or, storage device 120 of FIG. 1 may specify that SQE pairs may or may not be interleaved. For example, storage device 120 of FIG. 1 might specify that both SQEs 405 of FIG. 4 for a given SQE pair must be added to submission queue 410 of FIG. 4 before an SQE 405 of FIG. 4 for another SQE pair is added to submission queue 410 of FIG. 4. (Note that this limitation may only impact SQE pairs: there may be other SQEs 405 of FIG. 4 that are not paired that are interposed between the two SQEs 405 of FIG. 4 of the given SQE pair.)

Storage device 120 of FIG. 1 may also specify its performance for handling completion queue 420 of FIG. 4. For example, storage device 120 of FIG. 1 might specify that one completion queue entry is added to completion queue 420 of FIG. 4 for the SQE pair, or that each SQE 405 of FIG. 4 may result in a completion queue entry, even if SQE 405 of FIG. 4 is part of an SQE pair. For example, if the SQEs 405 of FIG. 4 in the SQE pair include different command IDs, then storage device 120 of FIG. 1 might return a separate completion queue entry for each SQE 405 of FIG. 4, even though SQEs 405 of FIG. 4 are part of an SQE pair.

Storage device 120 of FIG. 1 might also specify an order in which completion queue entries are added to completion queue 420 of FIG. 4, or a timing for completion queue entries. For example, storage device 120 of FIG. 1 might require that completion queue entries for SQEs 405 of FIG. 4 in an SQE pair be placed in completion queue 420 of FIG. 4 in the same order that SQEs 405 of FIG. 4 were placed in submission queue 410 of FIG. 4. Or, storage device 120 of FIG. 1 might specify that completion queue entries for SQEs 405 of FIG. 4 in the SQE pair be placed in completion queue 420 of FIG. 4 in a reverse order, to let processor 110 of FIG. 1 know that both SQEs 405 of FIG. 4 of the SQE pair were processed (so processor 110 might avoid waiting for the second completion queue entry if processor 110 of FIG. 1 does not need to receive the completion queue entry). Or, storage device 120 of FIG. 1 might place one completion queue entry in completion queue 420 of FIG. 4 immediately, to let processor 110 of FIG. 1 know that processing of the SQE pair has begun, and place the second completion queue entry in completion queue 420 of FIG. 4 when processing of the SQE pair has completed.

Storage device 120 of FIG. 1 might also specify timing requirements for completion queue entries. For example, storage device 120 of FIG. 1 might specify that both completion queue entries for the SQE pair are to be placed in completion queue 420 of FIG. 4 within some maximum amount of time, such as 1 millisecond (ms). Or, storage device 120 of FIG. 1 might specify that the two completion queue entries may be separated by some maximum number of intervening completion queue entries. For example, storage device 120 of FIG. 1 might specify that the second completion queue entry for an SQE pair may be no further than 10 completion queue entries from the first completion queue entry for the SQE pair, or that the two completion queue entries for an SQE pair may be adjacent in completion queue 420 of FIG. 4 (that is, no intervening completion queue entries). Or, storage device 120 of FIG. 1 might define a new completion queue entry opcode and/or structure that may be used to return results from both SQEs 405 of FIG. 4 in an SQE in a single completion queue entry.

Storage device 120 of FIG. 1 might also specify that if multiple completion queue entries are added to completion queue 420 of FIG. 4 in response to an SQE pair, storage device 120 of FIG. 1 might specify whether or not both completion queue entries are entered before completion queue tail pointer 425 of FIG. 4 is updated.

Once processor 110 of FIG. 1 has received information from storage device 120 of FIG. 1 about its capabilities (for example, via log page 1010), processor 110 of FIG. 1 may inform storage device 120 of FIG. 1 how it intends to manage SQE pairs. For example, processor 110 of FIG. 1 may use a Set Log Page command (or an equivalent command) to inform storage device 120 of FIG. 1 about how processor 110 of FIG. 1 wants storage device 120 of FIG. 1 to function.

Figure 11:
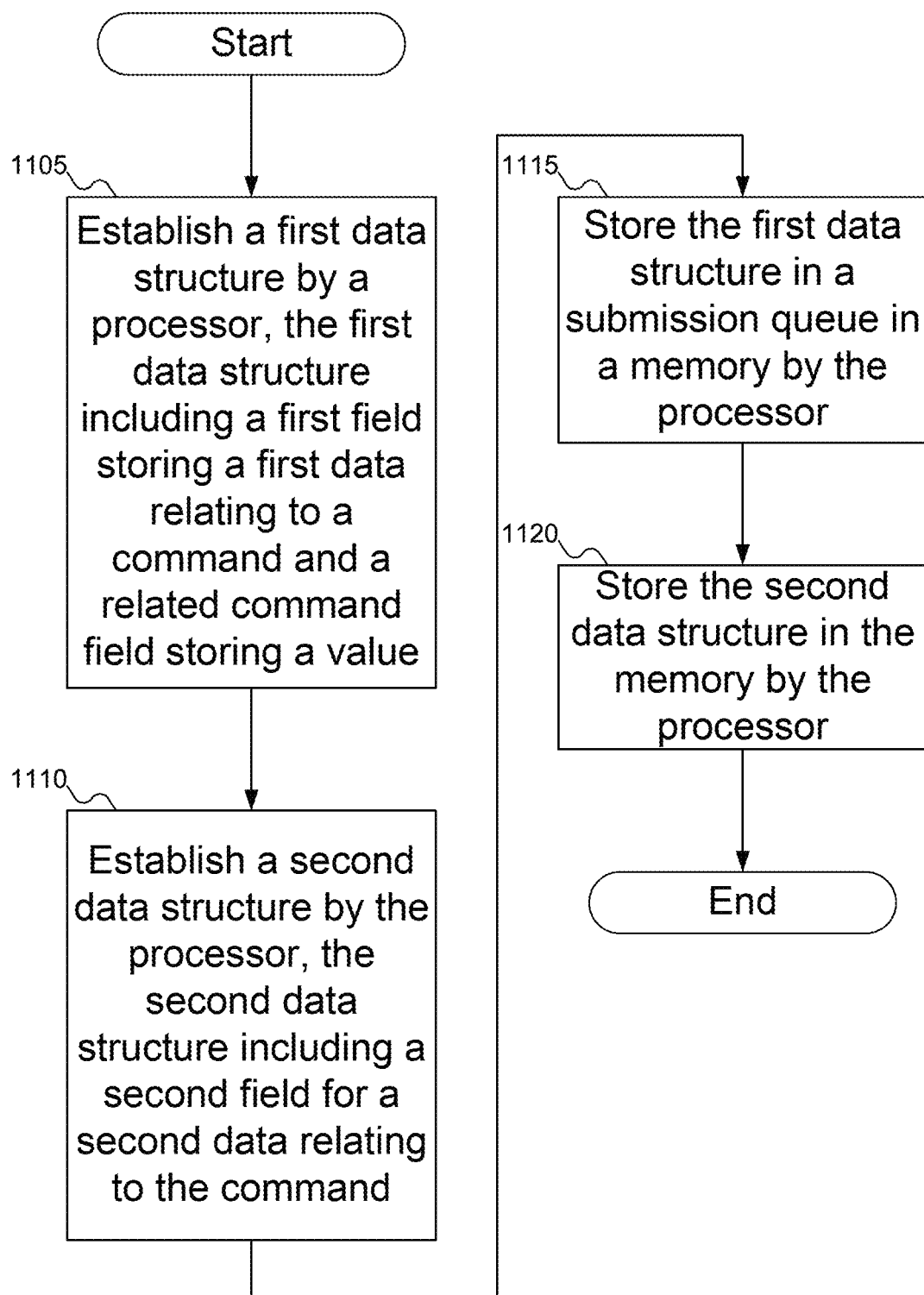
FIG. 11 shows a flowchart of an example procedure for the processor of FIG. 1 to establish the submission queue entry of FIG. 4 and store the data relating to the command in the memory of FIG. 1, according to embodiments of the disclosure.

FIG. 11 shows a flowchart of an example procedure for processor 110 of FIG. 1 to establish SQE 405 of FIG. 4 and store the data relating to the command in memory 115 of FIG. 1, according to embodiments of the disclosure. In FIG. 11, at block 1105, processor 110 of FIG. 1 may establish SQE 405 of FIG. 4. SQE 405 of FIG. 5 may include a field containing data, such as opcode 510 of FIG. 5 and/or command ID 515 of FIG. 5, which may relate to a command. SQE 405 may also contain another field, storing a value. At block 1110, processor 110 of FIG. 1 may establish a data structure, which may be another SQE 405 of FIG. 4. The data structure may contain additional data relating to the command. At block 1115, processor 110 of FIG. 1 may store SQE 405 of FIG. 4 in submission queue 410 of FIG. 4 in memory 115 of FIG. 1. Finally, at block 1015, processor 110 of FIG. 1 may store the data structure in memory 110 of FIG. 1. Storage device 120 of FIG. 1 may then use the value in the second field to identify SQE 405 of FIG. 4 and the data structure as related.

Figure 12:
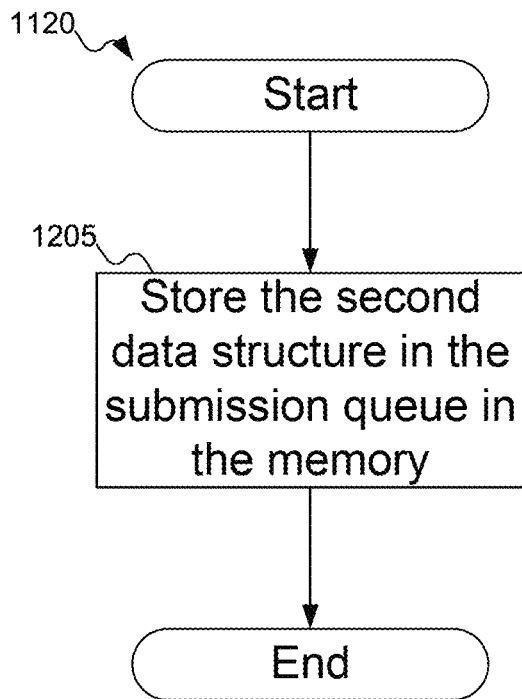
FIG. 12 shows a flowchart of an example procedure for the processor of FIG. 1 to store the data structure storing the data relating to the command in the submission queue of FIG. 4 in the memory of FIG. 1, according to embodiments of the disclosure.

FIG. 12 shows a flowchart of an example procedure for processor 110 of FIG. 1 to store the data structure storing the data relating to the command in submission queue 410 of FIG. 4 in memory 115 of FIG. 1, according to embodiments of the disclosure. In FIG. 12, at block 1205, processor 110 of FIG. 1 may store the data structure, which may be another SQE 405 of FIG. 4, in submission queue 410 of FIG. 4.

Figure 13:
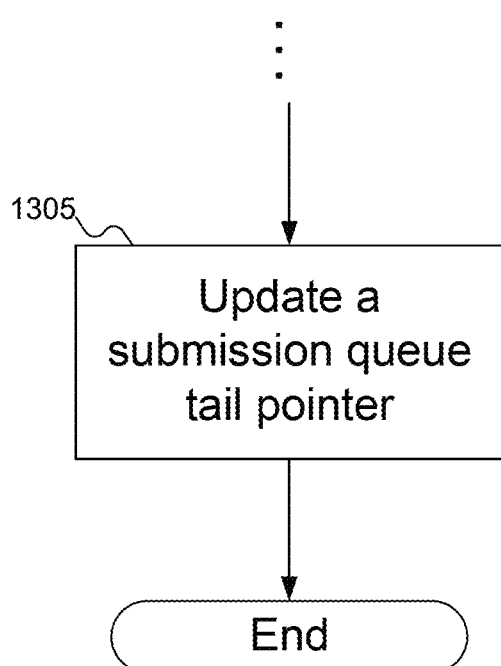
FIG. 13 shows a flowchart of an example procedure for the processor of FIG. 1 to inform the storage device of FIG. 1 that the submission queue entry of FIG. 4 is present in the submission queue of FIG. 4, according to embodiments of the disclosure.

FIG. 13 shows a flowchart of an example procedure for processor 110 of FIG. 1 to inform storage device 120 of FIG. 1 that SQE 405 of FIG. 4 is present in submission queue 410 of FIG. 4, according to embodiments of the disclosure. In FIG. 13, at block 1305, processor 110 of FIG. 1 may update submission queue tail pointer 415 of FIG. 4 to reflect that SQE 405 of FIG. 4 has been added to submission queue 410 of FIG. 4.

Figure 14:
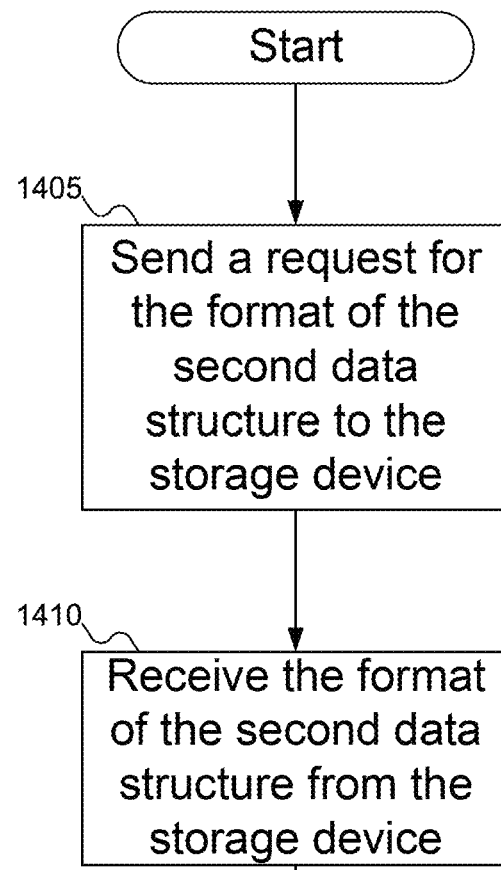
FIG. 14 shows a flowchart of an example procedure for the processor of FIG. 1 to request and receive information about the structure of the slots of FIG. 7 and/or the submission queue entry of FIG. 4 containing the additional data related to the command, as expected by the storage device of FIG. 1, according to embodiments of the disclosure.

FIG. 14 shows a flowchart of an example procedure for the processor of FIG. 1 to request and receive information about the structure of slots 705 of FIG. 7 and/or SQE 405 of FIG. 4 containing the additional data related to the command, as expected by the storage device of FIG. 1, according to embodiments of the disclosure. In FIG. 14, at block 1405, storage device 120 of FIG. 1 may receive request 905 of FIG. 9 from processor 110 of FIG. 1. At block 1410, storage device 120 of FIG. 1 may send log page 910 of FIG. 9 (or any other data structure that may include the requested information) to processor 110 of FIG. 1.

Figure 15:
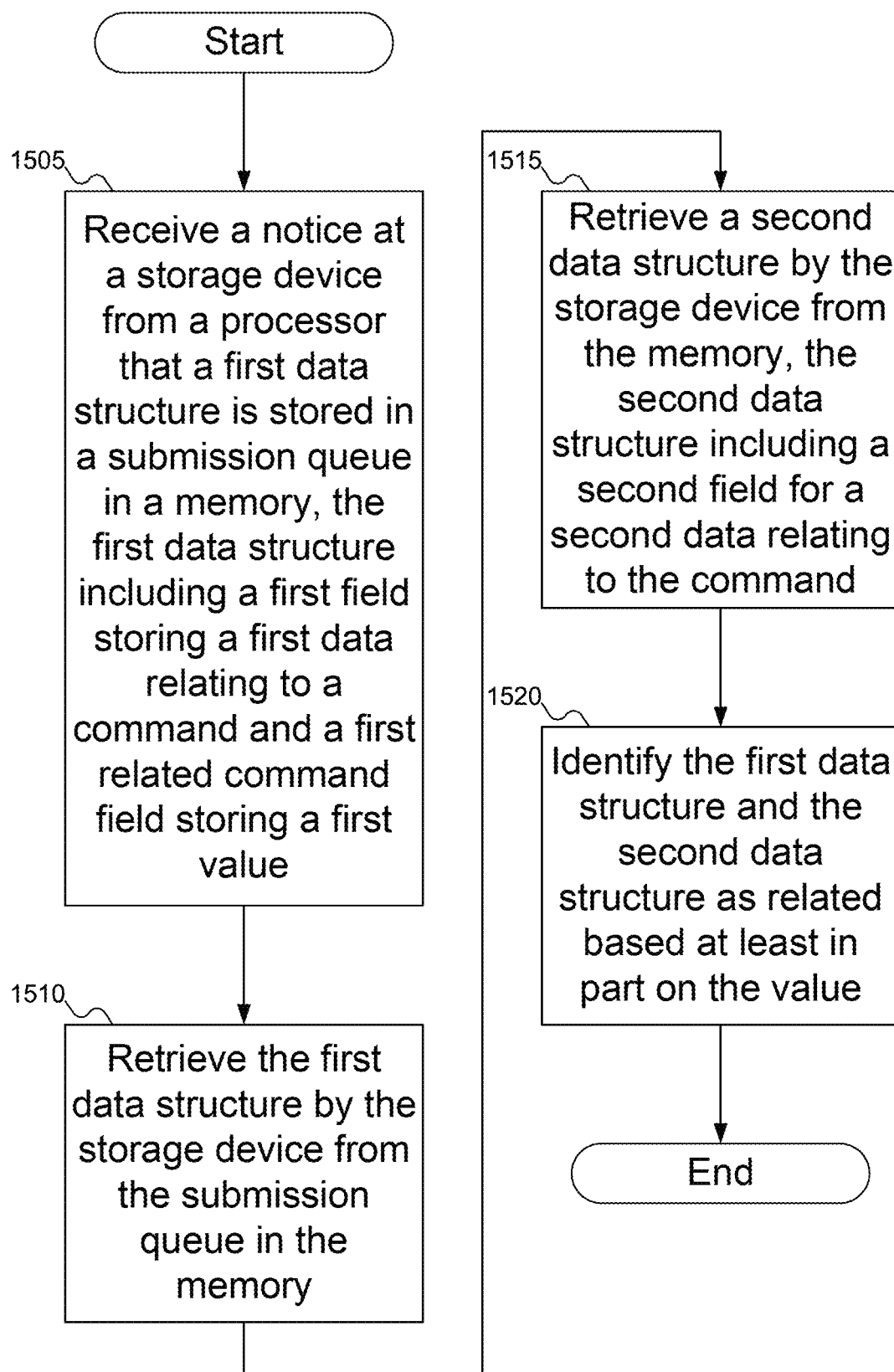
FIG. 15 shows a flowchart of an example procedure for the storage device of FIG. 1 to retrieve the submission queue entry of FIG. 4 and the data relating to the command, according to embodiments of the disclosure.

FIG. 15 shows a flowchart of an example procedure for storage device 120 of FIG. 1 to retrieve SQE 405 of FIG. 4 and the data relating to the command, according to embodiments of the disclosure. In FIG. 15, at block 1505, storage device 120 of FIG. 1 may receive a notification from processor 110 of FIG. 1 that SQE 405 of FIG. 4 has been added to submission queue 410 of FIG. 4. This notification may be through processor 110 of FIG. 1 updating submission queue tail pointer 415 of FIG. 4, or through processor 110 of FIG. 1 ringing a doorbell. Note that this notification is merely an alert, and does not necessarily provide any information about what data is present in SQE 405 of FIG. 4 (or other data structures, such as in slots 705 of FIG. 7). At block 1510, storage device 120 of FIG. 1 may retrieve SQE 405 of FIG. 4 from submission queue 410 of FIG. 4 in memory 115 of FIG. 1. At block 1515, storage device 120 of FIG. 1 may retrieve a data structure, either from slots 705 of FIG. 7 or from another SQE 405 of FIG. 4, from memory 115 of FIG. 1. Finally at block 1520, storage device 120 of FIG. 1 may identify SQE 405 of FIG. 4 and the data structure as related, based at least in part on a value in a field of SQE 405 of FIG. 4.

Figure 16:
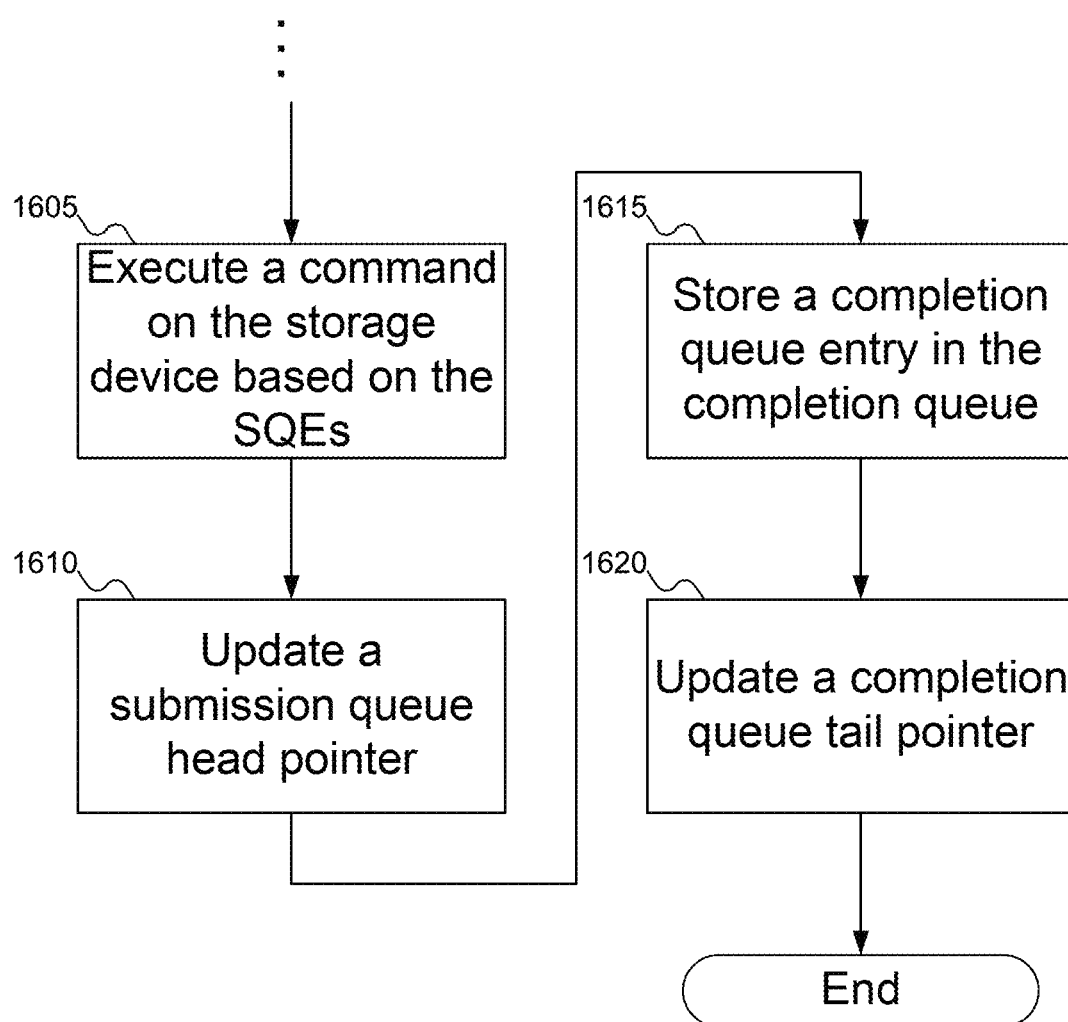
FIG. 16 shows a flowchart of an example procedure for the storage device of FIG. 1 to execute a command based on the submission queue entry of FIG. 4 and the data relating to the command, according to embodiments of the disclosure.

FIG. 16 shows a flowchart of an example procedure for storage device 120 of FIG. 1 to execute a command based on SQE 405 of FIG. 4 and the data relating to the command, according to embodiments of the disclosure. In FIG. 16, at block 1605, storage device 120 of FIG. 1 may execute a command based on submission queue 405 of FIG. 4. Storage device 120 of FIG. 1 may also execute the command using data relating to the command from another SQE 405 of FIG. 4 or slots 705 of FIG. 7. At block 1610, storage device 120 of FIG. 1 may update submission queue head pointer 610 of FIG. 6 to reflect that SQE 405 of FIG. 4 has been retrieved from submission queue 410 of FIG. 4. At block 1615, storage device 120 of FIG. 1 may store a completion queue entry (or more than one completion queue entry) in completion queue 420 of FIG. 4. Finally, at block 1620, storage device 120 of FIG. 1 may update a completion queue tail pointer to reflect that the completion queue entry/entries has been added to completion queue 420 of FIG. 4.

FIG. 17 shows a flowchart of an example procedure for storage device 120 of FIG. 1 to retrieve a second SQE 405 of FIG. 4 from submission queue 410 of FIG. 4 and to identify the second SQE 405 of FIG. 4 as being related to SQE 405 of FIG. 4, according to embodiments of the disclosure. In FIG. 17, at block 1705, storage device 120 of FIG. 1 may retrieve the second SQE 405 of FIG. 4 from submission queue 410 of FIG. 4. Like the first SQE 405 of FIG. 4, the second SQE 405 of FIG. 4 may store a value. At block 1710, storage device 120 of FIG. 1 may use to identify the two SQEs 405 of FIG. 4 as related using the values in the two SQEs 405 of FIG. 4.

FIG. 18 shows a flowchart of an example procedure for storage device 120 of FIG. 1 to store SQE 405 of FIG. 4 in set-aside queue 805 of FIG. 8, according to embodiments of the disclosure. At block 1805, after determining that SQE 405 of FIG. 4 may be related to another SQE 405 of FIG. 4 that storage device 120 of FIG. 1 has not retrieved from submission queue 410 of FIG. 4, storage device 120 of FIG. 1 may store SQE 405 of FIG. 4 in set-aside queue 805 of FIG. 8. Then, when storage device 120 of FIG. 1 retrieves the second SQE 405 of FIG. 4 that contains the related data, storage device 120 of FIG. 1 may retrieve SQE 405 of FIG. 4 from set-aside queue 805 of FIG. 8. As discussed above, the related SQEs 405 of FIG. 4 may be retrieved in either order: whichever SQE 405 of FIG. 4 is retrieved from submission queue 410 of FIG. 4 first may be stored in set-aside queue 805 until the second SQE 405 of FIG. 4 is retrieved from submission queue 410 of FIG. 4. Set-aside queue 805 of FIG. 8 might or might not be managed in order by storage device 120 of FIG. 1, and it may be referred to as a buffer rather than queue.

FIG. 19 shows a flowchart of an example procedure for storage device 120 to retrieve a third SQE 405 of FIG. 4 between the two related SQEs 405 of FIG. 4, according to embodiments of the disclosure. In FIG. 19, at block 1905, after storage device 120 of FIG. 1 retrieves one related SQE 405 of FIG. 4 but before storage device 120 of FIG. 1 retrieves the second related SQE 405 of FIG. 4, storage device 120 of FIG. 1 may retrieve a third (unrelated) SQE 405 of FIG. 4 from submission queue 410 of FIG. 4. This shows that not only may the related SQEs 405 of FIG. 4 be in any order, the related SQEs 405 of FIG. 4 do not have to be consecutive in submission queue 410 of FIG. 4.

FIG. 20 shows a flowchart of an example procedure for storage device 120 of FIG. 1 to retrieve data relating to a command from slots 705 of FIG. 7, according to embodiments of the disclosure. In FIG. 20, at block 2005, storage device 120 of FIG. 1 may retrieve the data structure from slots 705 of FIG. 7.

In the above embodiments of the disclosure, unused bits that are available in the structure of SQE 405 of FIG. 4 may be used to indicate that the data relating to the command is being extended in some manner. But in other embodiments of the disclosure, it may be possible to reuse existing structures in SQE 405 of FIG. 4, rather than using currently unused bits. While the discussion below focuses on the use of Fused 505 of FIG. 5, embodiments of the disclosure may extend to any existing field.

Fused 505 of FIG. 5 may be used to store values that identify two SQEs 405 of FIG. 4 that are related, and to identify which SQE 405 of FIG. 4 stores the main command structure and which SQE 405 of FIG. 4 stores the additional data. For example, setting Fused 505 of FIG. 5 to "01" may indicate that SQE 405 of FIG. 4 stores the main command structure, whereas setting Fused 505 of FIG. 5 to "10" may indicate that SQE 405 of FIG. 4 stores additional data for the command. In other words, both SQEs 405 of FIG. 4 are part of the same command: they are not separate commands to be executed by storage device 120 of FIG. 1.

In some embodiments of the disclosure, the related SQEs 405 of FIG. 4 may be added to submission queue 410 of FIG. 4 consecutively, which may reduce the need for storage device 120 of FIG. 1 to buffer one SQE 405 of FIG. 4 while waiting to retrieve the second SQE 405 of FIG. 4 from submission queue 410 of FIG. 4.

Figure 21:
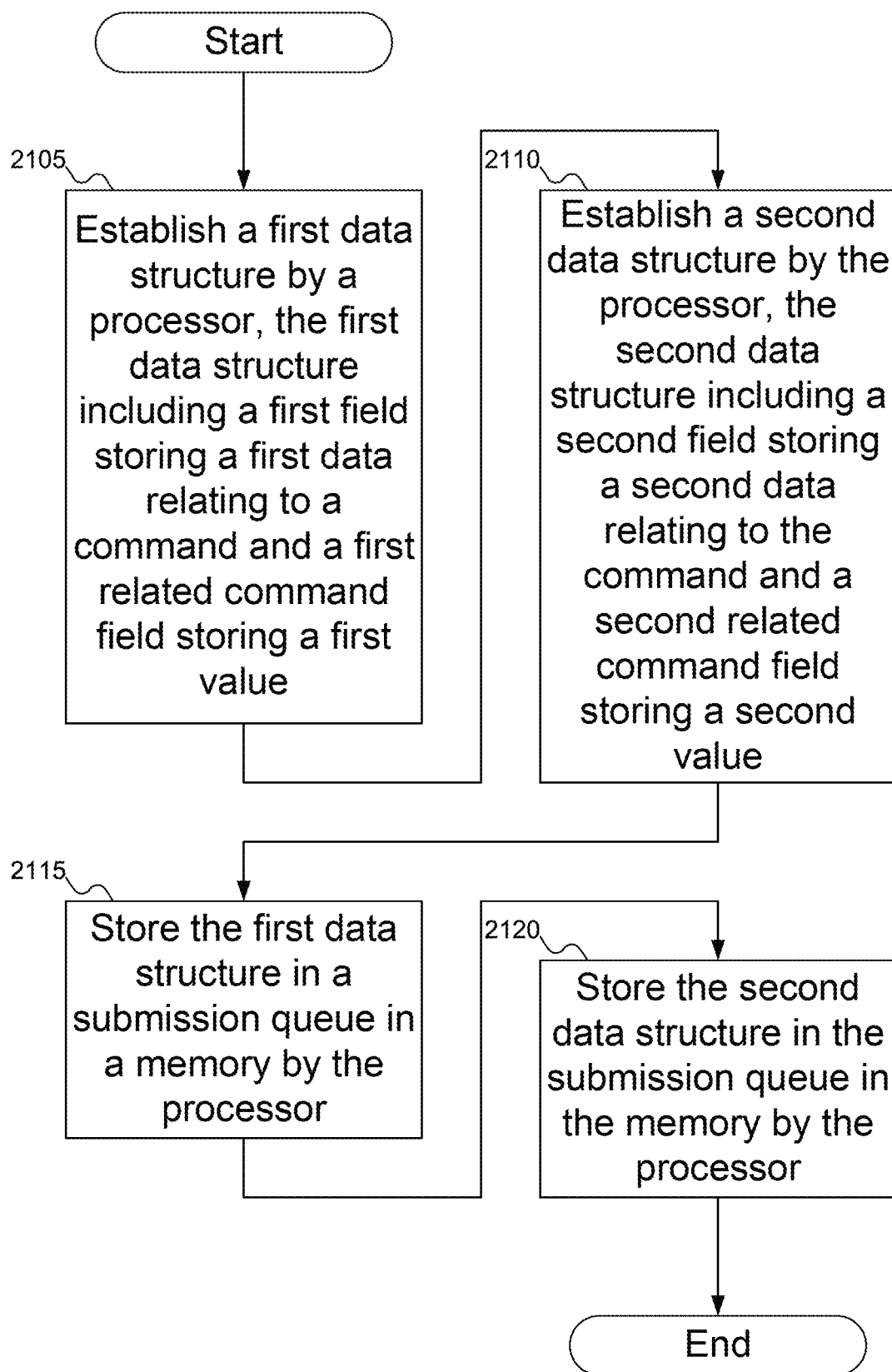
FIG. 21 shows a flowchart of an example procedure for the processor of FIG. 1 to establish two related submission queue entries of FIG. 4 and add them to the submission queue of FIG. 4, according to embodiments of the disclosure.

FIG. 21 shows a flowchart of an example procedure for processor 110 of FIG. 1 to establish two related SQEs 405 of FIG. 4 and add them to submission queue 410 of FIG. 4, according to embodiments of the disclosure. In FIG. 21, at block 2105, processor 110 of FIG. 1 may establish a first SQE 405 of FIG. 4. The first SQE 405 of FIG. 5 may include a field containing data relating to a command. The first SQE 405 may also contain another field, storing a value. At block 2110, processor 110 of FIG. 1 may establish a second SQE 405 of FIG. 4. The second SQE 405 of FIG. 4 may contain additional data relating to the command, as well as another field storing a value. At block 2115, processor 110 of FIG. 1 may store the first SQE 405 of FIG. 4 in submission queue 410 of FIG. 4 in memory 115 of FIG. 1. Finally, at block 2120, processor 110 of FIG. 1 may store the second SQE 405 of FIG. 4 in submission queue 410 of FIG. 4 in memory 110 of FIG. 1. Storage device 120 of FIG. 1 may then use the values in the two SQEs 405 of FIG. 4 to identify that the two SQEs 405 of FIG. 4 are related.

Figure 22A:
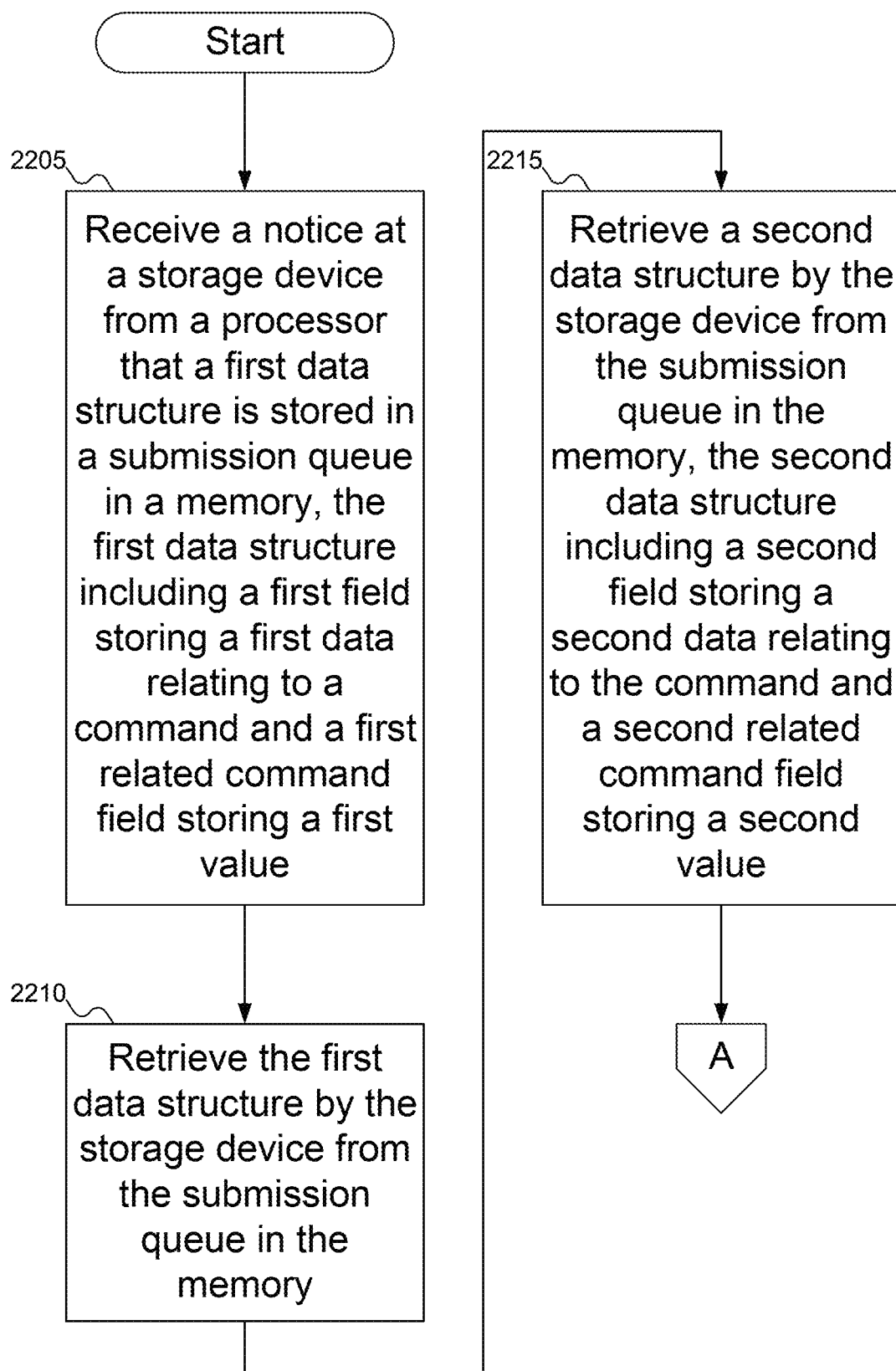
FIG. 22A shows a flowchart of an example procedure for the storage device of FIG. 1 to retrieve two related submission queue entries of FIG. 4, according to embodiments of the disclosure.
Figure 22B:
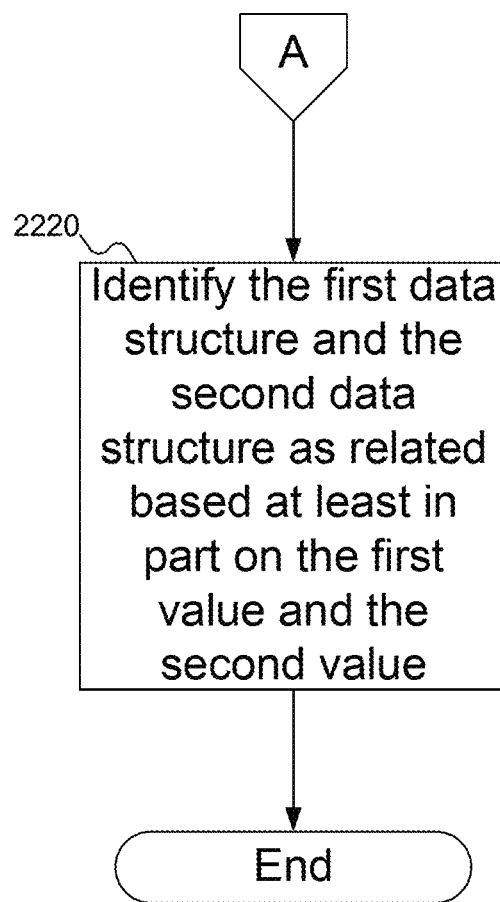
FIG. 22B continues the flowchart of an example procedure for the storage device of FIG. 1 to retrieve two related submission queue entries of FIG. 4, according to embodiments of the disclosure.

FIGS. 22A-22B show a flowchart of an example procedure for storage device 120 of FIG. 1 to retrieve two related SQEs 405 of FIG. 4, according to embodiments of the disclosure. In FIG. 22A, at block 2205, storage device 120 of FIG. 1 may receive a notification from processor 110 of FIG. 1 that a first SQE 405 of FIG. 4 has been added to submission queue 410 of FIG. 4. This notification may be through processor 110 of FIG. 1 updating submission queue tail pointer 415 of FIG. 4, or through processor 110 of FIG. 1 ringing a doorbell. Note that this notification is merely an alert, and does not necessarily provide any information about what data is present in SQE 405 of FIG. 4. At block 2210, storage device 120 of FIG. 1 may retrieve the first SQE 405 of FIG. 4 from submission queue 410 of FIG. 4 in memory 115 of FIG. 1. The first SQE 405 of FIG. 4 may have a field storing data relating to a command. The first SQE 405 of FIG. 4 may also have another field storing a value. At block 2215, storage device 120 of FIG. 1 may retrieve a second SQE 405 of FIG. 4 from submission queue 410 of FIG. 4 in memory 115 of FIG. 1. The second SQE 405 of FIG. 4 may have a field storing data relating to the command. The second SQE 405 of FIG. 4 may also have another field storing a value. Finally at block 2220 (FIG. 22B), storage device 120 of FIG. 1 may identify the two SQEs 405 of FIG. 4 as related, based at least in part on the values in the fields of SQEs 405 of FIG. 4.

Figure 23:
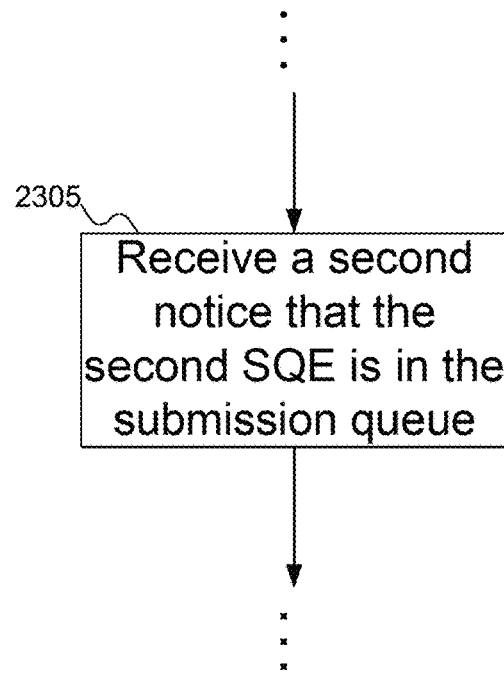
FIG. 23 shows a flowchart of an example procedure for the storage device to receive a notice from the processor of FIG. 1 that the second submission queue entry of FIG. 4 has been added to the submission queue of FIG. 4, according to embodiments of the disclosure.

FIG. 23 shows a flowchart of an example procedure for storage device 120 to receive a notice from processor 110 of FIG. 1 that the second SQE 405 of FIG. 4 has been added to submission queue 410 of FIG. 4, according to embodiments of the disclosure. In FIG. 23, at block 2305, storage device 120 of FIG. 1 may receive a notification from processor 110 of FIG. 1 that the second SQE 405 of FIG. 4 has been added to submission queue 410 of FIG. 4. This notification may be through processor 110 of FIG. 1 updating submission queue tail pointer 415 of FIG. 4, or through processor 110 of FIG. 1 ringing a doorbell. Note that this notification may be merely an alert, and does not necessarily provide any information about what data is present in SQE 405 of FIG. 4.

In FIGS. 11-23, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Some embodiments of the disclosure may include a submission queue and slots. The slots may store entries including additional data for a command for which there might not be room in a corresponding submission queue entry. Embodiments of the disclosure offer a technical advantage by providing a mechanism to provide additional data relating to a command with minimal changes to the submission queue entry (the changes might be as minimal as just including a flag that there is a shadow queue entry).

Some embodiments of the disclosure may include a submission queue and a set-aside queue. Upon encountering a submission queue entry for which there is another submission queue entry containing additional data relating to the command, the storage device may store the first submission queue entry in the set-aside queue until the second submission queue entry is retrieved. Embodiments of the disclosure offer a technical advantage by providing a mechanism to provide additional data relating to a command by repurposing fields in the submission queue entry that the storage device may calculate for itself, thereby increasing the amount of data provided without increasing the size of the submission queue entry.

Some embodiments of the disclosure may include a submission queue. Upon encountering a submission queue entry for which there is another submission queue entry containing additional data relating to the command, the storage device may retrieve the next submission queue entry, which may contain the additional data relating to the command. Embodiments of the disclosure offer a technical advantage by providing a mechanism to provide additional data relating to a command by repurposing fields in the submission queue entry that the storage device may calculate for itself, thereby increasing the amount of data provided without increasing the size of the submission queue entry.

Embodiments of the disclosure may include systems, methods, and apparatuses, which may involve hosts, solid state storage devices (SSD), and SSD controllers which use one or more methods of managing Submission Queue Entries (SQE). Embodiments of the disclosure may enable continued expansion of Nonvolatile Memory Express (NVMe) SQEs while not expanding the use of 64 byte SQEs.

In some embodiments the methods and apparatuses may follow some or all of the following actions:
1. The host may write SQ Entry into a memory location, for example, DRAM.
2. The host may write the SQ Tail Doorbell update to the device.
3. The device may read the SQ Entry.
4. The command may execute.
5. The device may write the Completion Queue (CQ) Entry.
6. The device controller may generate one or more Interrupts and send them to the host.
7. The host may read the CQ Entry.
8. The host may write the CQ Head Doorbell (DB) update to the device.

SQEs in their present state, are running low or out of space. Overflowing of the 64 bytes in the SQE may cause many issues in compatibility, speed and processing capabilities of current and future systems.

Certain bits in SQEs are not presently assigned a purpose for communicating information about the write command (or other commands). Embodiments of the disclosure exemplary of the write command should not be deemed limiting and one in the art would appreciate that any type of SQE would be applicable and conceptualized (for example, write commands, flush, compare, verify, copy, reservation register, etc.). For example, in the NVMe specification 2.0c, 33 bits are not currently in use. Some commands may have more bits available.

The "I/O Submission Queue Entry Size" field in "Controller Configuration" (CC.IOSQES) and SQES field in Identify Controller enable powers of two increases. Therefore, hosts and SSDs both use hardware accelerations around 64 bytes. Reassignment of unused bits, or double usage of bits, extends the usefulness of 64-byte SQEs by expanding backwards compatibility, saving system resources, and increasing efficiency in future systems. In one example, bit 10 may be used to indicate a normal write command that uses a second definition of Write SQE where the Logical Block Storage Tag (LBST), Logical Block Application Tag (LBAT), and Logical Block Application Tag Mask (LB ATM) fields all contain a secondary meaning.

Any of the storage devices disclosed herein may communicate through any interfaces and/or protocols including Peripheral Component Interconnect Express (PCIe), Nonvolatile Memory Express (NVMe), NVMe-over-fabric (NVMe-oF), Ethernet, Transmission Control Protocol/Internet Protocol (TCP/IP), User Datagram Protocol (UDP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, Hypertext Transfer Protocol (HTTP), and/or the like, or any combination thereof.

Any of the functionality disclosed herein may be implemented with hardware, software, or a combination thereof including combinational logic, sequential logic, one or more timers, counters, registers, and/or state machines, one or more complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs) and/or the like, executing instructions stored in any type of memory, or any combination thereof. In some embodiments of the disclosure, one or more components may be implemented as a system-on-chip (SOC).

In the embodiments of the disclosure described herein, the operations are example operations, and may involve various additional operations not explicitly illustrated. In some embodiments of the disclosure, some of the illustrated operations may be omitted. In some embodiments of the disclosure, one or more of the operations may be performed by components other than those illustrated herein. Additionally, in some embodiments of the disclosure, the temporal order of the operations may be varied.

Table of Acronyms

PRP Physical Region Page
STC Self-test Code
SGL Scatter Gather List
FUA Force Unit Access
LB ST Logical Block Storage Tag
DSM Dataset Management
ILBRT Initial Logical Block Reference Tag
DSPEC Directive Specific
LB A Logical Block Address
LBAT Logical Block Application Tag
LB ATM Logical Block Application Tag Mask
LR Limited Retry Some embodiments of the disclosure may use a signal to tell the drive to look for a follow-on SQE. The new signal may allow out of ordering. The second Write command SQE may enable more options and fields per command that uses them. For example, the entries may be one after another, they may be separated with other submission queue entries inside of them, etc.

Some exemplary embodiments include:
The OpCode used may be the same or different. For example, different may identify it as a "part 2" SQE. Similarly, same may have a bit to describe it as a secondary set of fields for a follow-on SQE.
The CMD ID may be the same or different. For example, CMD ID of the 1st SQE may be passed within the 2nd SQE. Similarly, the CMD ID may be reused to identify the same command.
The same OpCode and same CMD ID may be used. For example, bit 10 may say the commands are linked. Further, bit 11 may say whether the command is 1st or 2nd in the linked SQEs. The 2nd SQE may have new field definitions.

A different Opcode and different CMD ID may be used. For example, bit 10 may indicate to search for the other SQE.

In some embodiments more bits may be added, such as bits 11, 12, and 13. This may enable more than 1 SQE to be linked at a time. Bit 10 may set pairs of two different SQEs together. Bit 11 may set pairs of two other SQEs together.

In another embodiment of the disclosure, a reserved FUSED 11b (or bit 10) may indicate to search for a 2nd SQE. The internal drive may put this SQE on a set aside Queue. The second command may have a new Opcode and signal to go find the other SQE pair. For example, the second SQE has the 1st SQE's CMD ID inside the structure.

In yet another embodiment, a reserved FUSED 11b may indicate to search for another SQE. Bits 10-13 may communicate the SQE group. 0000b is an ID of a group of two or more SQEs that are interpreted together, for example. In another example, 0101b is a different group ID of two or more SQEs that are interpreted together.

In addition, other storage, such as slots, stored elsewhere in memory, may be used to store additional data for the SQE. In some embodiments of the disclosure, the slots may be may be stored consecutively in host addressable memory and may be numbered. The size of the slots may be fixed in advance, and each slot may have the same size, so that given a base address, a slot number, and a slot size, the address for the slot may be quickly determined. In other embodiments of the disclosure, the slots may be stored in different locations, and/or may have variable size. The address of each slot may be stored, so that the address may be easily located.

In some embodiments of the disclosure, the host may identify a particular version of the embodiments of the disclosure being used, which may define a particular size for each slot (and therefore how much data is being stored therein). In other embodiments of the disclosure, the slot itself, either as part of the data structure of the data or as a separate entry within the slot, may indicate how much data is stored in the slot. Such embodiments may improve performance, since the storage device then can determine how much data to read from the slot, which may avoid reading blank or garbage data (that is, data not written into the slot by the host for that SQE).

Certain bits in the SQE may be used to identify whether there is additional data stored in a slot, and may identify which slot stores the additional data. For example, the FUSED bits may be set to 11 to indicate that a slot stores additional data, or some other bit in the SQE may also be used. Some bits—for example, bits 10-13—may be used to store the number of the slot storing the additional data. The number of slots may determine how many bits may be used to identify the slot number.

Slots may be used in any order: slots do not have to be used in order.

In some embodiments of the disclosure, it may be up to the host to track which slots have been used and which are free. The host may determine when a slot has been freed by tracking the head doorbell pointer: if the head doorbell pointer has been advanced past the SQE that was associated with that slot, then the slot has been freed and may be reused. In some embodiments of the disclosure, the host may wait until it receives a completion entry corresponding to the SQE is returned. But completion of processing of the SQE entry is not required: only that the storage device has read the data from the slot.

In other embodiments of the disclosure, the apparatuses and methods may use the existing FUSED command structure (bits 8 and 9 in double word 0). Further, in some embodiments of the disclosure, the second Write command SQE may contain the extra bits used. In some embodiments of the disclosure, a new use-case on the existing FUSED flow may be added. Some multi-threaded Host systems may avoid inserting both FUSED commands back-to-back in the submission queue in some embodiments.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a memory, comprising:
 a first data structure stored in the memory, the first data structure including:
 a first field to store a first data relating to a command; and
 a related command field, the related command field to store a value;
 a second data structure stored in the memory, the second data structure including a second field to store a second data relating to the command; and
 a queue stored in the memory, the queue including the first data structure,
 wherein a storage device is configured to identify the first data structure and the second data structure as related based at least in part on the value.

Statement 2. An embodiment of the disclosure includes the memory according to statement 1, wherein the queue includes a submission queue or a completion queue.

Statement 3. An embodiment of the disclosure includes the memory according to statement 1, wherein the first data structure further includes a third field to store a third data relating to the command.

Statement 4. An embodiment of the disclosure includes the memory according to statement 1, wherein:
 the second data structure further includes a second related command field, the second related command field to store a second value;
 the queue includes the first data structure and the second data structure; and
 the storage device is configured to identify the first data structure and the second data structure as related based at least in part on the value and the second value.

Statement 5. An embodiment of the disclosure includes the memory according to statement 4, wherein the related command field includes bits 8 and 9 of double word 0.

Statement 6. An embodiment of the disclosure includes the memory according to statement 5, wherein the value includes 11.

Statement 7. An embodiment of the disclosure includes the memory according to statement 4, wherein the related command field includes a group identifier for the first data structure and the second data structure.

Statement 8. An embodiment of the disclosure includes the memory according to statement 7, wherein:
 the second related command field includes the group identifier; and
 the storage device is configured to pair the first data structure with the second data structure based at least in part on the group identifier.

Statement 9. An embodiment of the disclosure includes the memory according to statement 4, wherein:
 the first data structure includes a third field to store at least an operation code (opcode) or a command identifier; and
 the second data structure includes a fourth field, the fourth field including at least the opcode or the command identifier.

Statement 10. An embodiment of the disclosure includes the memory according to statement 4, wherein the storage device is configured to store the first data structure in a set-aside queue based at least in part on the value and to pair the second data structure with the first data structure in the set-aside queue.

Statement 11. An embodiment of the disclosure includes the memory according to statement 4, wherein the first data structure further includes a third field to store a value indicating the presence of the second data structure.

Statement 12. An embodiment of the disclosure includes the memory according to statement 1, wherein the value includes a slot number, the slot number identifying the second data structure.

Statement 13. An embodiment of the disclosure includes the memory according to statement 12, wherein the first data structure includes a third related command field, the third related command field to store a second value indicating the presence of the slot number.

Statement 14. An embodiment of the disclosure includes the memory according to statement 13, wherein the third related command field includes a FUSED field of the first data structure.

Statement 15. An embodiment of the disclosure includes the memory according to statement 14, wherein the FUSED field includes bits eight and nine of first double word 0 of the first data structure.

Statement 16. An embodiment of the disclosure includes the memory according to statement 15, wherein the second value is 11.

Statement 17. An embodiment of the disclosure includes the memory according to statement 12, wherein the second data structure includes at least a structure version, a structure size, or a structure format.

Statement 18. An embodiment of the disclosure includes a system, comprising:
- a processor;
- a storage device, the storage device connected to the processor; and
- a memory, the memory connected to the processor and the storage device, the memory including:
  - a queue, the queue including a first data structure including:
    - a first field to store a first data relating to a command; and
    - a related command field, the related command field to store a value; and
  - a second data structure, the second data structure including a second field to store a second data relating to the command,
  - wherein the processor is configured to store the first data structure in the queue in the memory and the second data structure in the memory, and
  - wherein a storage device is configured to identify the first data structure and the second data structure as related based at least in part on the value.

Statement 19. An embodiment of the disclosure includes the system according to statement 18, wherein the queue includes a submission queue or a completion queue.

Statement 20. An embodiment of the disclosure includes the system according to statement 18, wherein the first data structure includes a third field to store a third data relating to the command.

Statement 21. An embodiment of the disclosure includes the system according to statement 18, wherein:
- the second data structure further includes a second related command field, the second related command field to store a second value;
- the queue includes the first data structure and the second data structure; and
- the storage device is configured to identify the first data structure and the second data structure as related based at least in part on the value and the second value.

Statement 22. An embodiment of the disclosure includes the system according to statement 21, wherein the related command field includes bits 8 and 9 of double word 0.

Statement 23. An embodiment of the disclosure includes the system according to statement 22, wherein the value includes 11.

Statement 24. An embodiment of the disclosure includes the system according to statement 21, wherein the related command field includes a group identifier for the first data structure and the second data structure.

Statement 25. An embodiment of the disclosure includes the system according to statement 24, wherein:
- the second related command field includes the group identifier; and
- the storage device is configured to pair the first data structure with the second data structure based at least in part on the group identifier.

Statement 26. An embodiment of the disclosure includes the system according to statement 21, wherein:
- the first data structure includes a third field to store at least an operation code (opcode) or a command identifier; and
- the second data structure includes a fourth field, the fourth field including at least the opcode or the command identifier.

Statement 27. An embodiment of the disclosure includes the system according to statement 21, wherein the storage device is configured to store the first data structure in a set-aside queue based at least in part on the value and to pair the second data structure with the first data structure in the set-aside queue.

Statement 28. An embodiment of the disclosure includes the system according to statement 21, wherein the first data structure further includes a third field to store a value indicating the presence of the second data structure.

Statement 29. An embodiment of the disclosure includes the system according to statement 18, wherein the value includes a slot number, the slot number identifying the second data structure.

Statement 30. An embodiment of the disclosure includes the system according to statement 29, wherein the first data structure includes a third related command field, the third related command field to store a second value indicating the presence of the slot number.

Statement 31. An embodiment of the disclosure includes the system according to statement 30, wherein the third related command field includes a FUSED field of the first data structure.

Statement 32. An embodiment of the disclosure includes the system according to statement 31, wherein the FUSED field includes bits eight and nine of first double word 0 of the first data structure.

Statement 33. An embodiment of the disclosure includes the system according to statement 32, wherein the second value is 11.

Statement 34. An embodiment of the disclosure includes the system according to statement 29, wherein the second data structure includes at least a structure version, a structure size, or a structure format.

Statement 35. An embodiment of the disclosure includes a method, comprising:
- establishing a first data structure by a processor, the first data structure including a first field storing a first data relating to a command and a related command field storing a value;
- establishing a second data structure by the processor, the second data structure including a second field for a second data relating to the command;
- storing the first data structure in a queue in a memory by the processor; and
- storing the second data structure in the memory by the processor,
- wherein a storage device is configured to identify the first data structure and the second data structure as related based at least in part on the value.

Statement 36. An embodiment of the disclosure includes the method according to statement 35, wherein the queue includes a submission queue or a completion queue.

Statement 37. An embodiment of the disclosure includes the method according to statement 35, further comprising updating a queue tail pointer for the queue in a storage controller of the storage device.

Statement 38. An embodiment of the disclosure includes the method according to statement 35, wherein the first data structure further includes a third field storing a third data for the command.

Statement 39. An embodiment of the disclosure includes the method according to statement 35, wherein:

the second data structure further includes a second related command field, the second related command field storing a second value;
storing the second data structure in the memory by the processor includes storing the second data structure in the queue in the memory by the processor; and
the storage device is configured to identify the first data structure and the second data structure as related based at least in part on the value and the second value.

Statement 40. An embodiment of the disclosure includes the method according to statement 39, wherein the related command field includes bits 8 and 9 of double word 0.

Statement 41. An embodiment of the disclosure includes the method according to statement 40, wherein the value includes 11.

Statement 42. An embodiment of the disclosure includes the method according to statement 39, wherein the related command field includes a group identifier for the first data structure and the second data structure.

Statement 43. An embodiment of the disclosure includes the method according to statement 42, wherein:
the second related command field includes the group identifier; and
the storage device is configured to pair the first data structure with the second data structure based at least in part on the group identifier.

Statement 44. An embodiment of the disclosure includes the method according to statement 39, wherein:
the first data structure a third field storing at least an operation code (opcode) or a command identifier; and
the second data structure includes a fourth field, the fourth field including at least the opcode or the command identifier.

Statement 45. An embodiment of the disclosure includes the method according to statement 39, wherein the storage device is configured to store the first data structure in a set-aside queue based at least in part on the value and to pair the second data structure with the first data structure in the set-aside queue.

Statement 46. An embodiment of the disclosure includes the method according to statement 39, wherein storing the second data structure in the queue in the memory by the processor includes storing the first data structure and the second data structure in the queue out-of-order by the processor.

Statement 47. An embodiment of the disclosure includes the method according to statement 39, wherein the first data structure and the second data structure are separated in the queue by a third data structure.

Statement 48. An embodiment of the disclosure includes the method according to statement 39, wherein the first data structure further includes a third field storing a value indicating the presence of the second data structure.

Statement 49. An embodiment of the disclosure includes the method according to statement 35, wherein the value includes a slot number, the slot number identifying the second data structure.

Statement 50. An embodiment of the disclosure includes the method according to statement 49, wherein the first data structure includes a third related command field, the third related command field storing a second value indicating the presence of the slot number.

Statement 51. An embodiment of the disclosure includes the method according to statement 50, wherein the third related command field includes a FUSED field of the first data structure.

Statement 52. An embodiment of the disclosure includes the method according to statement 51, wherein the FUSED field includes bits eight and nine of first double word 0 of the first data structure.

Statement 53. An embodiment of the disclosure includes the method according to statement 52, wherein second value is 11.

Statement 54. An embodiment of the disclosure includes the method according to statement 49, wherein the second data structure includes at least a structure version, a structure size, or a structure format.

Statement 55. An embodiment of the disclosure includes a method, comprising:
receiving a notice at a storage device from a processor that a first data structure is stored in a queue in a memory, the first data structure including a first field storing a first data relating to a command and a first related command field storing a first value;
retrieving the first data structure by the storage device from the queue in the memory;
retrieving a second data structure by the storage device from the memory, the second data structure including a second field for a second data relating to the command; and
identifying the first data structure and the second data structure as related based at least in part on the value.

Statement 56. An embodiment of the disclosure includes the method according to statement 55, wherein the queue includes a submission queue or a completion queue.

Statement 57. An embodiment of the disclosure includes the method according to statement 55, further comprising executing the command based at least in part on the first data relating to the command and the second data relating to the command.

Statement 58. An embodiment of the disclosure includes the method according to statement 57, further comprising updating a queue head pointer for the queue in the memory.

Statement 59. An embodiment of the disclosure includes the method according to statement 55, wherein:
the second data structure further includes a second related command field, the second related command field storing a second value;
retrieving the second data structure by the storage device from the memory includes retrieving the second data structure by the storage device from the queue in the memory; and
identifying the first data structure and the second data structure as related based at least in part on the value includes identifying the first data structure and the second data structure as related based at least in part on the value and the second value.

Statement 60. An embodiment of the disclosure includes the method according to statement 59, wherein the related command field includes bits 8 and 9 of double word 0.

Statement 61. An embodiment of the disclosure includes the method according to statement 60, wherein the value includes 11.

Statement 62. An embodiment of the disclosure includes the method according to statement 59, wherein the related command field includes a group identifier for the first data structure and the second data structure.

Statement 63. An embodiment of the disclosure includes the method according to statement 62, wherein:
the second related command field includes the group identifier; and
the first data structure and the second data structure as related based at least in part on the value includes he first data structure and the second data structure as related based at least in part on the group identifier.

Statement 64. An embodiment of the disclosure includes the method according to statement 59, wherein:
the first data structure a third field storing at least an operation code (opcode) or a command identifier; and
the second data structure includes a fourth field, the fourth field including at least the opcode or the command identifier.

Statement 65. An embodiment of the disclosure includes the method according to statement 59, wherein retrieving the first data structure by the storage device from the queue in the memory includes storing the first data structure in a set-aside queue.

Statement 66. An embodiment of the disclosure includes the method according to statement 59, wherein retrieving the second data structure by the storage device from the queue in the memory includes retrieving the second data structure by the storage device from the queue in the memory out-of-order relative to the first data structure.

Statement 67. An embodiment of the disclosure includes the method according to statement 59, further comprising retrieving a third data structure from the queue in the memory, the third data structure between the first data structure and the second data structure in the queue in the memory.

Statement 68. An embodiment of the disclosure includes the method according to statement 59, wherein the first data structure further includes a third field storing a value indicating the presence of the second data structure.

Statement 69. An embodiment of the disclosure includes the method according to statement 55, wherein the value includes a slot number, the slot number identifying the second data structure.

Statement 70. An embodiment of the disclosure includes the method according to statement 69, wherein retrieving the second data structure by the storage device from the memory includes retrieving the second data structure by the storage device from the memory based at least in part on the slot number.

Statement 71. An embodiment of the disclosure includes the method according to statement 69, wherein the first data structure includes a third related command field, the third related command field storing a second value indicating the presence of the slot number.

Statement 72. An embodiment of the disclosure includes the method according to statement 71, wherein the third related command field includes a FUSED field of the first data structure.

Statement 73. An embodiment of the disclosure includes the method according to statement 72, wherein the FUSED field includes bits eight and nine of first double word 0 of the first data structure.

Statement 74. An embodiment of the disclosure includes the method according to statement 73, wherein second value is 11.

Statement 75. An embodiment of the disclosure includes the method according to statement 69, wherein the second data structure includes at least a structure version, a structure size, or a structure format.

Statement 76. An embodiment of the disclosure includes an article, comprising a non-transitory storage medium, the non-transitory storage medium having stored thereon instructions that, when executed by a machine, result in:
establishing a first data structure by a processor, the first data structure including a first field storing a first data relating to a command and a related command field storing a value;
establishing a second data structure by the processor, the second data structure including a second field for a second data relating to the command;
storing the first data structure in a queue in a memory by the processor; and
storing the second data structure in the memory by the processor,
wherein a storage device is configured to identify the first data structure and the second data structure as related based at least in part on the value.

Statement 77. An embodiment of the disclosure includes the article according to statement 76, wherein the queue includes a submission queue or a completion queue.

Statement 78. An embodiment of the disclosure includes the article according to statement 76, the non-transitory storage medium having stored thereon further instructions that, when executed by the machine, result in updating a queue tail pointer for the queue in a storage controller of the storage device.

Statement 79. An embodiment of the disclosure includes the article according to statement 76, wherein the first data structure further includes a third field storing a third data for the command.

Statement 80. An embodiment of the disclosure includes the article according to statement 76, wherein:
the second data structure further includes a second related command field, the second related command field storing a second value;
storing the second data structure in the memory by the processor includes storing the second data structure in the queue in the memory by the processor; and
the storage device is configured to identify the first data structure and the second data structure as related based at least in part on the value and the second value.

Statement 81. An embodiment of the disclosure includes the article according to statement 80, wherein the related command field includes bits 8 and 9 of double word 0.

Statement 82. An embodiment of the disclosure includes the article according to statement 81, wherein the value includes 11.

Statement 83. An embodiment of the disclosure includes the article according to statement 80, wherein the related command field includes a group identifier for the first data structure and the second data structure.

Statement 84. An embodiment of the disclosure includes the article according to statement 83, wherein:
the second related command field includes the group identifier; and
the storage device is configured to pair the first data structure with the second data structure based at least in part on the group identifier.

Statement 85. An embodiment of the disclosure includes the article according to statement 80, wherein:
the first data structure a third field storing at least an operation code (opcode) or a command identifier; and
the second data structure includes a fourth field, the fourth field including at least the opcode or the command identifier.

Statement 86. An embodiment of the disclosure includes the article according to statement 80, wherein the storage device is configured to store the first data structure in a set-aside queue based at least in part on the value and to pair the second data structure with the first data structure in the set-aside queue.

Statement 87. An embodiment of the disclosure includes the article according to statement 80, wherein storing the second data structure in the queue in the memory by the processor includes storing the first data structure and the second data structure in the queue out-of-order by the processor.

Statement 88. An embodiment of the disclosure includes the article according to statement 80, wherein the first data structure and the second data structure are separated in the queue by a third data structure.

Statement 89. An embodiment of the disclosure includes the article according to statement 80, wherein the first data structure further includes a third field storing a value indicating the presence of the second data structure.

Statement 90. An embodiment of the disclosure includes the article according to statement 76, wherein the value includes a slot number, the slot number identifying the second data structure.

Statement 91. An embodiment of the disclosure includes the article according to statement 90, wherein the first data structure includes a third related command field, the third related command field storing a second value indicating the presence of the slot number.

Statement 92. An embodiment of the disclosure includes the article according to statement 91, wherein the third related command field includes a FUSED field the first data structure.

Statement 93. An embodiment of the disclosure includes the article according to statement 92 wherein the FUSED field includes bits eight and nine of first double word 0 of the first data structure.

Statement 94. An embodiment of the disclosure includes the article according to statement 93, wherein second value is 11.

Statement 95. An embodiment of the disclosure includes the article according to statement 90, wherein the second data structure includes at least a structure version, a structure size, or a structure format.

Statement 96. An embodiment of the disclosure includes an article, comprising a non-transitory storage medium, the non-transitory storage medium having stored thereon instructions that, when executed by a machine, result in:
  receiving a notice at a storage device from a processor that a first data structure is stored in a queue in a memory, the first data structure including a first field storing a first data relating to a command and a first related command field storing a first value;
  retrieving the first data structure by the storage device from the queue in the memory;
  retrieving a second data structure by the storage device from the memory, the second data structure including a second field for a second data relating to the command; and
  identifying the first data structure and the second data structure as related based at least in part on the value.

Statement 97. An embodiment of the disclosure includes the article according to statement 96, wherein the queue includes a submission queue or a completion queue.

Statement 98. An embodiment of the disclosure includes the article according to statement 96, the non-transitory storage medium having stored thereon further instructions that, when executed by the machine, result in executing the command based at least in part on the first data relating to the command and the second data relating to the command.

Statement 99. An embodiment of the disclosure includes the article according to statement 98, the non-transitory storage medium having stored thereon further instructions that, when executed by the machine, result in updating a queue head pointer for the queue in the memory.

Statement 100. An embodiment of the disclosure includes the article according to statement 96, wherein:
  the second data structure further includes a second related command field, the second related command field storing a second value;
  retrieving the second data structure by the storage device from the memory includes retrieving the second data structure by the storage device from the queue in the memory; and
  identifying the first data structure and the second data structure as related based at least in part on the value includes identifying the first data structure and the second data structure as related based at least in part on the value and the second value.

Statement 101. An embodiment of the disclosure includes the article according to statement 100, wherein the related command field includes bits 8 and 9 of double word 0.

Statement 102. An embodiment of the disclosure includes the article according to statement 101, wherein the value includes 11.

Statement 103. An embodiment of the disclosure includes the article according to statement 100, wherein the related command field includes a group identifier for the first data structure and the second data structure.

Statement 104. An embodiment of the disclosure includes the article according to statement 103, wherein:
  the second related command field includes the group identifier; and
  the first data structure and the second data structure as related based at least in part on the value includes he first data structure and the second data structure as related based at least in part on the group identifier.

Statement 105. An embodiment of the disclosure includes the article according to statement 100, wherein:
  the first data structure a third field storing at least an operation code (opcode) or a command identifier; and
  the second data structure includes a fourth field, the fourth field including at least the opcode or the command identifier.

Statement 106. An embodiment of the disclosure includes the article according to statement 100, wherein retrieving the first data structure by the storage device from the queue in the memory includes storing the first data structure in a set-aside queue.

Statement 107. An embodiment of the disclosure includes the article according to statement 100, wherein retrieving the second data structure by the storage device from the queue in the memory includes retrieving the second data structure by the storage device from the queue in the memory out-of-order relative to the first data structure.

Statement 108. An embodiment of the disclosure includes the article according to statement 100, the non-transitory storage medium having stored thereon further instructions that, when executed by the machine, result in retrieving a third data structure from the queue in the memory, the third data structure between the first data structure and the second data structure in the queue in the memory.

Statement 109. An embodiment of the disclosure includes the article according to statement 100, wherein the first data structure further includes a third field storing a value indicating the presence of the second data structure.

Statement 110. An embodiment of the disclosure includes the article according to statement 96, wherein the value includes a slot number, the slot number identifying the second data structure.

Statement 111. An embodiment of the disclosure includes the article according to statement 110, wherein retrieving the second data structure by the storage device from the memory includes retrieving the second data structure by the storage device from the memory based at least in part on the slot number.

Statement 112. An embodiment of the disclosure includes the article according to statement 110, wherein the first data structure includes a third related command field, the third related command field storing a second value indicating the presence of the slot number.

Statement 113. An embodiment of the disclosure includes the article according to statement 112, wherein the third related command field includes a FUSED field of the first data structure.

Statement 114. An embodiment of the disclosure includes the article according to statement 113, wherein the FUSED field includes bits eight and nine of first double word 0 of the first data structure.

Statement 115. An embodiment of the disclosure includes the article according to statement 114, wherein second value is 11.

Statement 116. An embodiment of the disclosure includes the article according to statement 110, wherein the second data structure includes at least a structure version, a structure size, or a structure format.

Statement 117. An embodiment of the disclosure includes a memory, comprising:
 a first data structure stored in the memory, the first data structure including:
  a first field to store a first data relating to a command; and
  a first related command field, the related command field to store a first value;
 a second data structure stored in the memory, the second data structure including:
  a second field to store a second data relating to the command; and
  a second related command field, the related command field to store a second value; and
 a queue stored in the memory, the queue including the first data structure and the second data structure,
 wherein a storage device is configured to identify the first data structure and the second data structure as related based at least in part on the first value and the second value.

Statement 118. An embodiment of the disclosure includes the memory according to statement 117, wherein the queue includes a submission queue or a completion queue.

Statement 119. An embodiment of the disclosure includes the memory according to statement 117, wherein the first data structure further includes a third field for a third data for the command.

Statement 120. An embodiment of the disclosure includes the memory according to statement 117, wherein the first data structure and the second data structure are stored consecutively in the queue.

Statement 121. An embodiment of the disclosure includes the memory according to statement 117, wherein the first data structure and the second data structure are in order in the queue.

Statement 122. An embodiment of the disclosure includes the memory according to statement 117, wherein:
 the first related command field includes a first FUSED field of the first data structure; and
 the second related command field includes a second FUSED field of the second data structure.

Statement 123. An embodiment of the disclosure includes the memory according to statement 122, wherein:
 the first FUSED field includes first bits eight and nine of first double word 0 of the first data structure; and
 the second FUSED field includes second bits eight and nine of second double word 0 of the second data structure.

Statement 124. An embodiment of the disclosure includes the memory according to statement 123, wherein:
 the first bits eight and nine of the first double word 0 are 01; and
 the second bits eight and nine of the second double word 0 are 10.

Statement 125. An embodiment of the disclosure includes a system, comprising:
 a processor;
 a storage device, the storage device connected to the processor; and
 a memory, the memory connected to the processor and the storage device, the memory including:
  a queue, the queue including a first data structure and a second data structure,
  the first data structure including:
  a first field to store a first data relating to a command; and
  a first related command field, the related command field to store a first value; and
  the second data structure including:
  a second field to store a second data relating to the command; and
  a second related command field, the related command field to store a second value,
  wherein the processor is configured to store the first data structure and the second data structure in the queue in the memory, and
  wherein the storage device is configured to identify the first data structure and the second data structure as related based at least in part on the first value and the second value.

Statement 126. An embodiment of the disclosure includes the system according to statement 125, wherein the first data structure further includes a third field for a third data for the command.

Statement 127. An embodiment of the disclosure includes the system according to statement 125, wherein the first data structure and the second data structure are stored consecutively in the queue.

Statement 128. An embodiment of the disclosure includes the system according to statement 125, wherein the first data structure and the second data structure are in order in the queue.

Statement 129. An embodiment of the disclosure includes the system according to statement 125, wherein:
 the first related command field includes a first FUSED field of the first data structure; and
 the second related command field includes a second FUSED field of the second data structure.

Statement 130. An embodiment of the disclosure includes the system according to statement 129, wherein:
 the first FUSED field includes first bits eight and nine of first double word 0 of the first data structure; and
 the second FUSED field includes second bits eight and nine of second double word 0 of the second data structure.

Statement 131. An embodiment of the disclosure includes the system according to statement 130, wherein:
the first bits eight and nine of the first double word 0 are 01; and
the second bits eight and nine of the second double word 0 are 10.

Statement 132. An embodiment of the disclosure includes a method, comprising:
establishing a first data structure by a processor, the first data structure including a first field storing a first data relating to a command and a first related command field storing a first value;
establishing a second data structure by the processor, the second data structure including a second field storing a second data relating to the command and a second related command field storing a second value;
storing the first data structure in a queue in a memory by the processor; and
storing the second data structure in the queue in the memory by the processor,
wherein a storage device is configured to identify the first data structure and the second data structure as related based at least in part on the first value and the second value.

Statement 133. An embodiment of the disclosure includes the method according to statement 132, wherein the queue includes a submission queue or a completion queue.

Statement 134. An embodiment of the disclosure includes the method according to statement 132, wherein the first data structure further includes a third field for a third data for the command.

Statement 135. An embodiment of the disclosure includes the method according to statement 132, further comprising updating a queue tail pointer for the queue in a storage controller of the storage device.

Statement 136. An embodiment of the disclosure includes the method according to statement 132, wherein storing the second data structure in the queue in the memory by the processor includes storing the second data structure consecutively to the first data structure in the queue in the memory by the processor.

Statement 137. An embodiment of the disclosure includes the method according to statement 136, wherein the first data structure and the second data structure are in order in the queue in the memory.

Statement 138. An embodiment of the disclosure includes the method according to statement 132, wherein:
the first related command field includes a first FUSED field of the first data structure; and
the second related command field includes a second FUSED field of the second data structure.

Statement 139. An embodiment of the disclosure includes the method according to statement 138, wherein:
the first FUSED field includes first bits eight and nine of first double word 0 of the first data structure; and
the second FUSED field includes second bits eight and nine of second double word 0 of the second data structure.

Statement 140. An embodiment of the disclosure includes the method according to statement 139, wherein:
the first bits eight and nine of the first double word 0 are 01; and
the second bits eight and nine of the second double word 0 are 10.

Statement 141. An embodiment of the disclosure includes a method, comprising:

receiving a notice at a storage device from a processor that a first data structure is stored in a queue in a memory, the first data structure including a first field storing a first data relating to a command and a first related command field storing a first value;
retrieving the first data structure by the storage device from the queue in the memory;
retrieving a second data structure by the storage device from the queue in the memory, the second data structure including a second field storing a second data relating to the command and a second related command field storing a second value;
identifying the first data structure and the second data structure as related based at least in part on the first value and the second value.

Statement 142. An embodiment of the disclosure includes the method according to statement 141, wherein the queue includes a submission queue or a completion queue.

Statement 143. An embodiment of the disclosure includes the method according to statement 141, further comprising executing the command based at least in part on the first data relating to the command and the second data relating to the command.

Statement 144. An embodiment of the disclosure includes the method according to statement 143, further comprising updating a queue head pointer for the queue in the memory.

Statement 145. An embodiment of the disclosure includes the method according to statement 141, further comprising receiving a second notice at the storage device from the processor that the second data structure is stored in the queue in the memory.

Statement 146. An embodiment of the disclosure includes the method according to statement 145, wherein retrieving the second data structure by the storage device from the queue in the memory is based at least in part on receiving the second notice at the storage device from the processor that the second data structure is stored in the queue in the memory.

Statement 147. An embodiment of the disclosure includes the method according to statement 141, wherein the first data structure further includes a third field for a third data for the command.

Statement 148. An embodiment of the disclosure includes the method according to statement 141, wherein the first data structure and the second data structure are retrieved consecutively by the storage device from the queue in the memory.

Statement 149. An embodiment of the disclosure includes the method according to statement 148, wherein the first data structure and the second data structure are retrieved in-order by the storage device from the queue in the memory.

Statement 150. An embodiment of the disclosure includes the method according to statement 141, wherein:
the first related command field includes a first FUSED field of the first data structure; and
the second related command field includes a second FUSED field of the second data structure.

Statement 151. An embodiment of the disclosure includes the method according to statement 150, wherein:
the first FUSED field includes first bits eight and nine of first double word 0 of the first data structure; and
the second FUSED field includes second bits eight and nine of second double word 0 of the second data structure.

Statement 152. An embodiment of the disclosure includes the method according to statement 151, wherein:

the first bits eight and nine of the first double word 0 are 01; and the second bits eight and nine of the second double word 0 are 10.

Statement 153. An embodiment of the disclosure includes an article, comprising a non-transitory storage medium, the non-transitory storage medium having stored thereon instructions that, when executed by a machine, result in:

establishing a first data structure by a processor, the first data structure including a first field storing a first data relating to a command and a first related command field storing a first value;

establishing a second data structure by the processor, the second data structure including a second field storing a second data relating to the command and a second related command field storing a second value;

storing the first data structure in a queue in a memory by the processor; and storing the second data structure in the queue in the memory by the processor, wherein a storage device is configured to identify the first data structure and the second data structure as related based at least in part on the first value and the second value.

Statement 154. An embodiment of the disclosure includes the article according to statement 153, wherein the queue includes a submission queue or a completion queue.

Statement 155. An embodiment of the disclosure includes the article according to statement 153, wherein the first data structure further includes a third field for a third data for the command.

Statement 156. An embodiment of the disclosure includes the article according to statement 153, the non-transitory storage medium having stored thereon further instructions that, when executed by the machine, result in updating a queue tail pointer for the queue in a storage controller of the storage device.

Statement 157. An embodiment of the disclosure includes the article according to statement 153, wherein storing the second data structure in the queue in the memory by the processor includes storing the second data structure consecutively to the first data structure in the queue in the memory by the processor.

Statement 158. An embodiment of the disclosure includes the article according to statement 157, wherein the first data structure and the second data structure are in order in the queue in the memory.

Statement 159. An embodiment of the disclosure includes the article according to statement 153, wherein:

the first related command field includes a first FUSED field of the first data structure; and the second related command field includes a second FUSED field of the second data structure.

Statement 160. An embodiment of the disclosure includes the article according to statement 159, wherein:

the first FUSED field includes first bits eight and nine of first double word 0 of the first data structure; and the second FUSED field includes second bits eight and nine of second double word 0 of the second data structure.

Statement 161. An embodiment of the disclosure includes the article according to statement 160, wherein:

the first bits eight and nine of the first double word 0 are 01; and the second bits eight and nine of the second double word 0 are 10.

Statement 162. An embodiment of the disclosure includes an article, comprising a non-transitory storage medium, the non-transitory storage medium having stored thereon instructions that, when executed by a machine, result in:

receiving a notice at a storage device from a processor that a first data structure is stored in a queue in a memory, the first data structure including a first field storing a first data relating to a command and a first related command field storing a first value;

retrieving the first data structure by the storage device from the queue in the memory;

retrieving a second data structure by the storage device from the queue in the memory, the second data structure including a second field storing a second data relating to the command and a second related command field storing a second value;

identifying the first data structure and the second data structure as related based at least in part on the first value and the second value.

Statement 163. An embodiment of the disclosure includes the article according to statement 162, wherein the queue includes a submission queue or a completion queue.

Statement 164. An embodiment of the disclosure includes the article according to statement 162, the non-transitory storage medium having stored thereon further instructions that, when executed by the machine, result in executing the command based at least in part on the first data relating to the command and the second data relating to the command.

Statement 165. An embodiment of the disclosure includes the article according to statement 164, the non-transitory storage medium having stored thereon further instructions that, when executed by the machine, result in updating a queue head pointer for the queue in the memory.

Statement 166. An embodiment of the disclosure includes the article according to statement 162, the non-transitory storage medium having stored thereon further instructions that, when executed by the machine, result in receiving a second notice at the storage device from the processor that the second data structure is stored in the queue in the memory.

Statement 167. An embodiment of the disclosure includes the article according to statement 166, wherein retrieving the second data structure by the storage device from the queue in the memory is based at least in part on receiving the second notice at the storage device from the processor that the second data structure is stored in the queue in the memory.

Statement 168. An embodiment of the disclosure includes the article according to statement 162, wherein the first data structure further includes a third field for a third data for the command.

Statement 169. An embodiment of the disclosure includes the article according to statement 162, wherein the first data structure and the second data structure are retrieved consecutively by the storage device from the queue in the memory.

Statement 170. An embodiment of the disclosure includes the article according to statement 169, wherein the first data structure and the second data structure are retrieved in-order by the storage device from the queue in the memory.

Statement 171. An embodiment of the disclosure includes the article according to statement 162, wherein:

the first related command field includes a first FUSED field of the first data structure; and the second related command field includes a second FUSED field of the second data structure.

Statement 172. An embodiment of the disclosure includes the article according to statement 171, wherein:
the first FUSED field includes first bits eight and nine of first double word 0 of the first data structure; and
the second FUSED field includes second bits eight and nine of second double word 0 of the second data structure.

Statement 173. An embodiment of the disclosure includes the article according to statement 172, wherein:
the first bits eight and nine of the first double word 0 are 01; and
the second bits eight and nine of the second double word 0 are 10.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A memory, comprising:
a first data structure stored in the memory, the first data structure including:
a first field to store a first data relating to a command;
a second field to store an operation code (opcode) value; and
a first related command field, the first related command field to store a first value;
a second data structure stored in the memory, the second data structure including:
a third field to store a second data relating to the command;
a fourth field to store the opcode value; and
a second related command field, the second related command field to store a second value; and
a queue stored in the memory, the queue including the first data structure, the second data structure, and a third data structure intervening between the first data structure and the second data structure in a sequence of access in the queue,
wherein a storage device is configured to identify the first data structure and the second data structure as related based at least in part on the first value, the second value, and the opcode value.

2. The memory according to claim 1, wherein the first related command field includes a group identifier for the first data structure and the second data structure.

3. The memory according to claim 2, wherein:
the second related command field includes the group identifier; and
the storage device is configured to pair the first data structure with the second data structure based at least in part on the group identifier.

4. The memory according to claim 1, wherein the storage device is configured to store the first data structure in a set-aside queue based at least in part on the first value and to pair the second data structure with the first data structure in the set-aside queue.

5. The memory according to claim 1, wherein the first data structure further includes a fifth field to store a third value indicating the presence of the second data structure.

6. The memory according to claim 1, wherein the first value includes 11.

7. The memory according to claim 1, wherein:
the first data structure includes a fifth field to store a command identifier value; and
the second data structure includes a sixth field, the sixth field storing the command identifier value.

8. A method, comprising:
establishing a first data structure by a processor, the first data structure including a first field storing a first data relating to a command, a second field to store an operation code (opcode) value, and a first related command field storing a first value;
establishing a second data structure by the processor, the second data structure including a third field for a second data relating to the command, a fourth field to store the opcode value, and a second related command field, the second related command field storing a second value;
storing the first data structure in a queue in a memory by the processor; and
storing the second data structure in the queue in the memory by the processor,
wherein a storage device is configured to identify the first data structure and the second data structure as related based at least in part on the first value, the second value, and the opcode value, and
wherein the queue includes a third data structure intervening between the first data structure and the second data structure in a sequence of access in the queue.

9. The method according to claim 8, wherein the first related command field includes a group identifier for the first data structure and the second data structure.

10. The method according to claim 9, wherein:
the second related command field includes the group identifier; and
the storage device is configured to pair the first data structure with the second data structure based at least in part on the group identifier.

11. The method according to claim 8, wherein storing the second data structure in the queue in the memory by the processor includes storing the first data structure and the second data structure in the queue out-of-order by the processor.

12. The method according to claim 8, wherein the first value includes 11.

13. The method according to claim 8, wherein:
the first data structure includes a fifth field storing a command identifier value; and
the second data structure includes a sixth field, the sixth field storing the command identifier value.

14. The method according to claim 8, wherein the first data structure further includes a fifth field storing a third value indicating the presence of the second data structure.

15. A memory, comprising:
a first data structure stored in the memory, the first data structure including:
a first field to store a first data relating to a command;
a second field to store an operation code (opcode) value; and
a first related command field, the first related command field to store a first value;
a second data structure stored in the memory, the second data structure including:
a third field to store a second data relating to the command;
a fourth field to store the opcode value; and
a second related command field, the second related command field to store a second value; and
a queue stored in the memory, the queue including the first data structure, the second data structure, and a third data structure intervening between the first data structure and the second data structure in a sequence of access in the queue, wherein a storage device is configured to identify the first data structure and the second data structure as related based at least in part on the first value, the second value, and the opcode value.

16. The memory according to claim 15, wherein:

the first related command field includes a first FUSED field of the first data structure; and the second related command field includes a second FUSED field of the second data structure.

17. The memory according to claim 16, wherein:

the first FUSED field includes first bits eight and nine of first double word 0 of the first data structure;

the second FUSED field includes second bits eight and nine of second double word 0 of the second data structure;

the first bits eight and nine of the first double word 0 are 01; and the second bits eight and nine of the second double word 0 are 10.

\* \* \* \* \*